United States Patent
Hughes et al.

(10) Patent No.: US 10,728,328 B2
(45) Date of Patent: Jul. 28, 2020

(54) SYSTEM AND METHOD FOR TRANSMITTING DATA VIA ETHERNET SWITCH DEVICES IN AN ETHERNET FABRIC

(71) Applicant: Dell Products L.P., Round Rock, TX (US)

(72) Inventors: Kevin Allen Hughes, Cedar Park, TX (US); Joseph LaSalle White, San Jose, CA (US); Jason Garth Pearce, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 861 days.

(21) Appl. No.: 15/133,036

(22) Filed: Apr. 19, 2016

(65) Prior Publication Data
US 2017/0302739 A1 Oct. 19, 2017

(51) Int. Cl.
*H04L 29/08* (2006.01)
*H04W 40/02* (2009.01)
*H04L 12/721* (2013.01)

(52) U.S. Cl.
CPC .... *H04L 67/1097* (2013.01); *H04L 29/08972* (2013.01); *H04L 45/38* (2013.01); *H04W 40/02* (2013.01); *H04L 45/12* (2013.01)

(58) Field of Classification Search
CPC .................................................. H04L 67/1097
See application file for complete search history.

(56) References Cited

U.S. PATENT DOCUMENTS

| 2007/0086361 A1* | 4/2007 | Allan | H04L 12/462 370/254 |
| 2009/0296726 A1* | 12/2009 | Snively | H04L 45/66 370/401 |
| 2011/0032936 A1* | 2/2011 | Ashwood-Smith | H04L 12/18 370/390 |
| 2011/0222538 A1 | 9/2011 | Singh et al. | |

(Continued)

OTHER PUBLICATIONS

Fibre Channel over Ethernet Initialization Protocol, Cisco, 2009, p. 1-12 (Year: 2009).*

(Continued)

*Primary Examiner* — Tonia L Dollinger
*Assistant Examiner* — Joseph M Cousins
(74) *Attorney, Agent, or Firm* — Haynes and Boone, LLP

(57) ABSTRACT

An Ethernet SAN system includes an initiator device and a target device coupled together by an Ethernet fabric that includes a plurality of Ethernet switch devices. The Ethernet switch devices exchange L2 FIP domain exchange multicast frames that include domain information associated with each of the Ethernet switch devices. That domain information is then used to exchange L2 FIP path exchange multicast frames that include path information associated with each of the Ethernet switch devices. That path information is then used to calculate path costs associated with at least some of the Ethernet switch devices. Those path costs are then used to exchange L2 FIP device exchange unicast frames that include device information associated with the initiator device and the target device. The Ethernet switch devices then transmit data between the initiator device and the target device based on the device information and the path costs.

20 Claims, 14 Drawing Sheets

(56) References Cited

U.S. PATENT DOCUMENTS

| | | |
|---|---|---|
| 2013/0148663 A1 | 6/2013 | Xiong |
| 2014/0112188 A1* | 4/2014 | Keesara, Sr. ........... H04L 45/16 370/254 |
| 2014/0269745 A1 | 9/2014 | Johnson et al. |

OTHER PUBLICATIONS

American National Standard for Information Technology, Fibre Channel Backbone- 5 (FC-BB-5) Rev.2, Jun. 4, 2009 p. 1-180 (Year: 2009).*
Nathan Fan, "Dijkstra's Algorith—YouTube," Nov. 24, 2012, 2 Pages, https://www.youtube.com/watch?v=gdmtOwyQlcl
Kevin Allen Hughes and Jason Garth Pearce, "Fiber Channel Over Ethernet (FCOE) Frame Forwarding System," U.S. Appl. No. 14/860,354, filed Sep. 21, 2015, 33 Pages.
Brocade, "FCoE End-To-End Forwarding," Sep. 21, 2015, San Jose, CA USA; pp. 1-3, http://www.brocade.com/downloads/documents/html_product_manuals/NOS_410_AG/GUID-F951A7C8-38EA-481D-8489-B62E61AC8F97.html.
Fulcrum Microsystems, Gary Lee, "Ethernet Fabric Requirements for FCoE in The Data Center," Ethernet Technology Summit, Feb. 2010, San Jose, CA USA; pp. 1-14, http://www.bswd.com/ETS10/ETS10-Lee.pdf.
Blogger.com, Svetlana, "San: FSPF = Fabric Shortest Path First," Mar. 22, 2013, Mountain View, CA USA, 2 Pages, http://sanjourny.blogspot.com/2013/05/fspf-fabric-shortest-path-first.html.

* cited by examiner

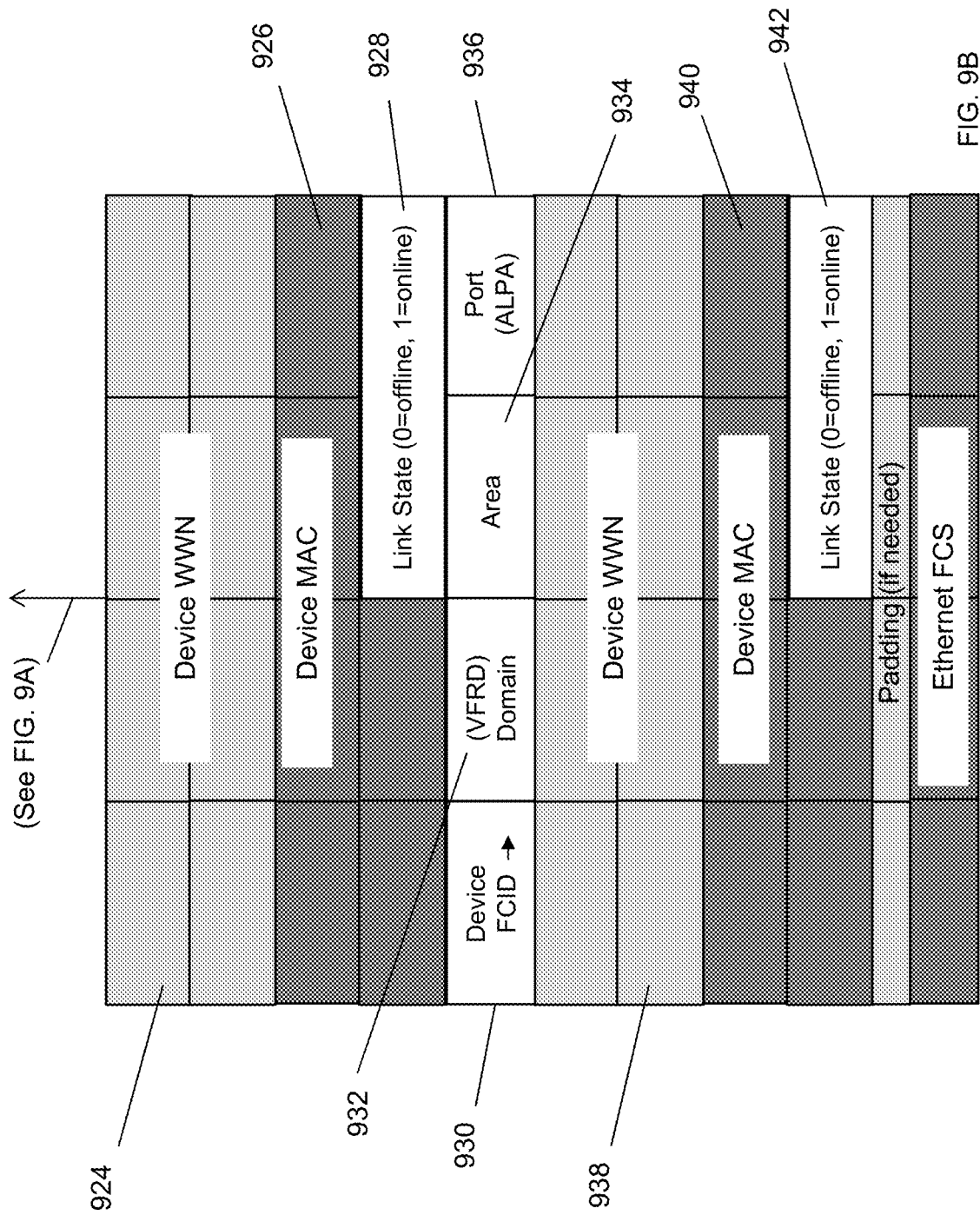

SYSTEM AND METHOD FOR TRANSMITTING DATA VIA ETHERNET SWITCH DEVICES IN AN ETHERNET FABRIC

BACKGROUND

The present disclosure relates generally to information handling systems, and more particularly to an Ethernet storage area network system provided with and/or utilized by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switches and storage systems, are sometimes used to provide Storage Area Networks (SANs) in order to allow for the storage and retrieval of data by other information handling systems such as, for example, servers. Conventional SANs, particularly those which store and transmit sensitive data, typically employ Fibre Channel (FC) fabrics (i.e., FC switches and/or other FC networking components), and SAN administrators are typically hesitant to employ Ethernet fabrics (e.g., Ethernet switches and/or other Ethernet networking components) with their SANs despite the lower cost of those Ethernet fabrics due to several deficiencies associated with Ethernet SANs. For example, Ethernet fabrics allow devices to be connected to and unconnected from the Ethernet fabric with little to no effort to authenticate those devices or keep track of which devices are connected to the Ethernet fabric, which can be problematic for use with SANs that store and transmit sensitive information. Furthermore, the state of links between Ethernet switches in an Ethernet fabric is indeterminate and time-lagged, as there is no hardware level link state detection mechanism in Ethernet fabrics other than bit syncing and link indicators, and timeouts are typically used in Ethernet fabrics to determine link states. For example, Ethernet fabrics such as Fiber Channel over Ethernet (FCoE) use keep alive timers and run link state probes, and those techniques requires exchanges that are on the order of seconds, while utilizing retries that provide for link state awareness that lags the actual link state by 10's of seconds and up to minutes, which causes delays in link state propagation through the Ethernet fabric and associated failover mechanisms.

Further still, Ethernet fabrics are a lossy medium where frames are delivered by best effort and can be dropped due to congestion. Flow control in Ethernet fabrics is typically accomplished by a Media Access Control (MAC) PAUSE frame, which can cause large losses of data frames when Ethernet switches get congested (as frames are discarded by the Ethernet switch cannot process them). The Ethernet Data Center Bridging (DCB) protocol standards made improvements to Ethernet fabric flow control by introducing a more granular version of the MAC PAUSE frame that provides a Priority Flow Control (PFC) mechanism between link endpoints, and adding a requirement that frames cannot just be discarded when an Ethernet switch is congested. However, as with the MAC PAUSE frames discussed above, DCB protocol standards do not provide the deterministic and controllable flow control available in FC fabrics. For these and other reasons, FC fabrics tends to be the fabrics of choice for SANs despite their higher costs.

Accordingly, it would be desirable to provide an improved Ethernet SAN fabric.

SUMMARY

According to one embodiment, an Information Handling System (HIS) includes a communication system; at least one database; an Ethernet processing system coupled to the communication system and the at least one database; and a memory system including instructions that, when executed by the Ethernet processing system, causes the Ethernet processing system to provide a storage fabric engine that is configured to: create a first layer-2 (L2) Fabric Initiation Protocol (FIP) domain exchange multicast frame that includes first domain information and transmit the first L2 FIP domain exchange multicast frame through the communication system to a plurality of Ethernet switch devices; receive a plurality of second L2 FIP domain exchange multicast frames through the communication system that include second domain information associated with the plurality of Ethernet switch devices; create a first L2 FIP path exchange multicast frame that includes first path information and transmit the first L2 FIP path exchange multicast frame through the communication system to the plurality of Ethernet switch devices, wherein the first L2 FIP path exchange multicast frame is transmitted based on the second domain information associated with the plurality of Ethernet switch devices; receive a plurality of second L2 FIP path exchange multicast frames through the communication system that include second path information associated with the plurality of Ethernet switch devices; calculate path costs based on the second path information associated with at least some of the plurality of Ethernet switch devices; create a first L2 FIP device exchange unicast frame that includes first device information associated with a first device connected to the communication system and transmit the first L2 FIP device exchange unicast frame through the communication system to the plurality of Ethernet switch devices, wherein the first L2 FIP device exchange unicast frame is transmitted based on the path costs; receive a plurality of second L2 FIP device exchange unicast frames through the communication system that include second device information associated with a second device connected to at one of the plurality of Ethernet switch devices; and transmit data between the first device and the second device through the communication system based on the second device information and the path costs.

BRIEF DESCRIPTION OF THE DRAWINGS

FIG. 9B is a schematic view illustrating an embodiment of a portion of the L2 FIP device link SCN unicast frame of FIG. 9A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
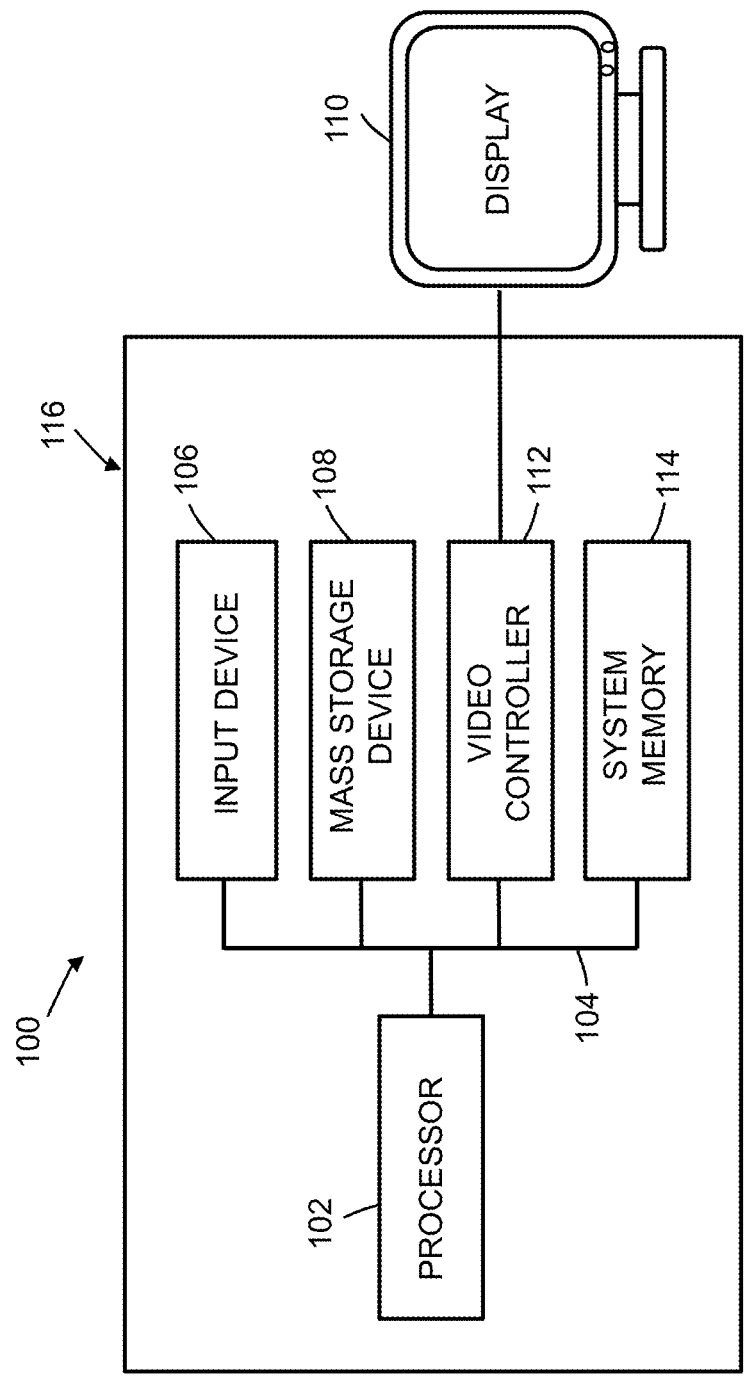
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
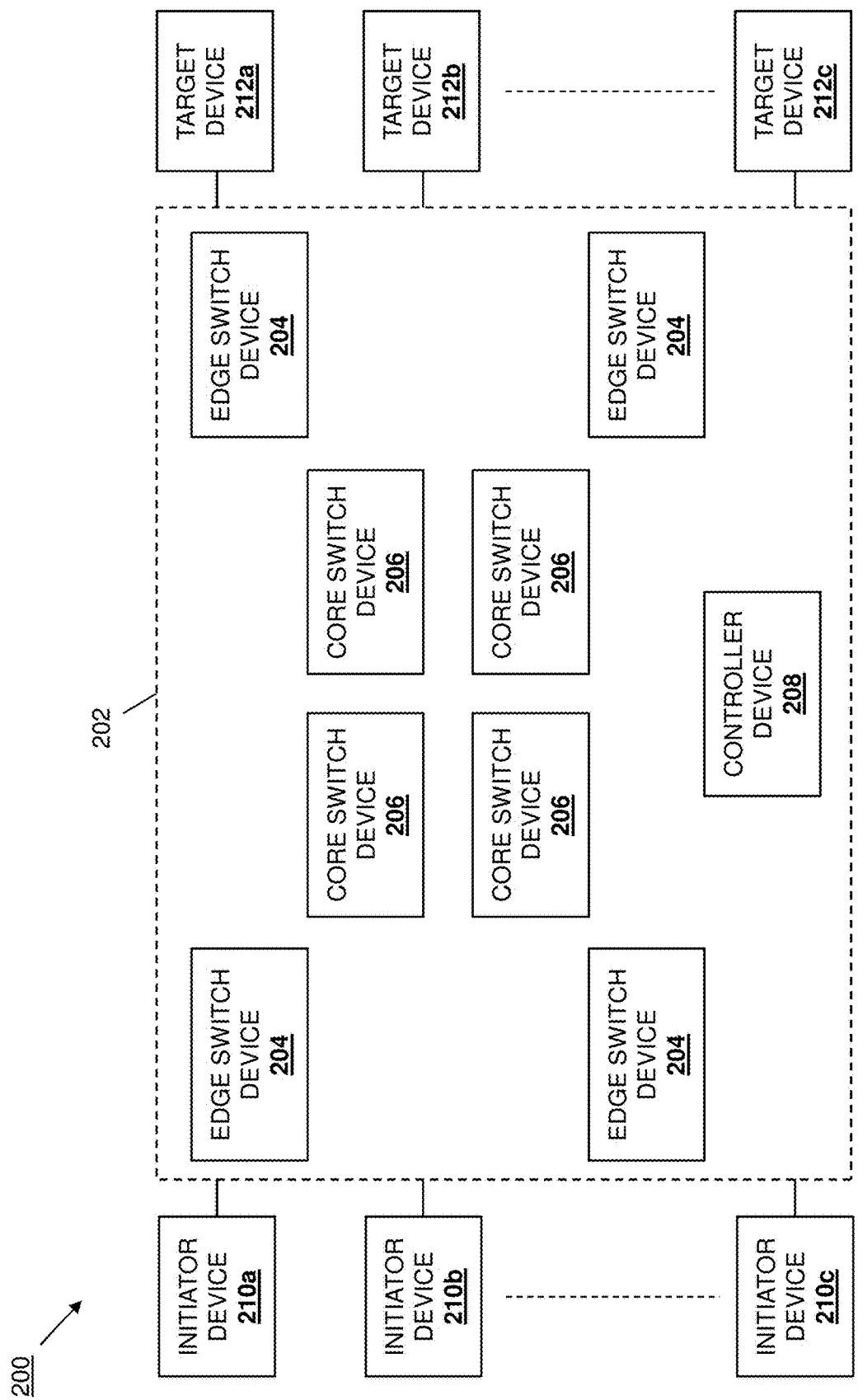
FIG. 2 is a schematic view illustrating an Ethernet Storage Area Network (SAN) system.

Referring now to FIG. 2, an embodiment of an Ethernet Storage Area Network (SAN) system 200 is illustrated. In the illustrated embodiment, the Ethernet SAN system 200 includes an Ethernet fabric 202 that includes a plurality of Ethernet switch devices that utilize Ethernet processing systems such as, for example, Ethernet switch chips, in order to route traffic via the Ethernet fabric 202. For example, the Ethernet fabric 202 may include a plurality of Ethernet edge switch devices 204 (referred to below as "edge switch devices 204") and a plurality of Ethernet core switch devices 206 (referred to below as "core switch devices 206") that may be interconnected via a plurality of Inter-Switch Links (ISLs) (not illustrated for clarity) in a variety of manners to provide the Ethernet fabric 202. For example, any pair of the edge switch devices 204 and/or core switch devices 206 may be coupled together via their inter-switch ports by one or more 10 gigabit or 40 gigabit Ethernet links that may be provided by, for example, DELL® enhanced storage fabric ISL's, available from DELL® Inc. of Round Rock, Tex., United States.

In a specific example, the edge switch devices 204 may include multiprotocol intelligent edge switch devices that may be storage system aware, may be Software Defined Networking (SDN) enabled, and may be managed by an orchestration and management system. Furthermore, the core switch devices 206 may be provided by any layer 2 (L2) switch device, may be Software Defined Networking (SDN) enabled, and may be managed by an orchestration and management as well. In the illustrated embodiment, the Ethernet fabric 202 also includes a controller device 208 that may be coupled to any of the edge switch devices 204 and core switch devices 206. For example, the controller device 208 may be provided by an SDN controller (e.g., in a rack mounted server) that may be managed by an orchestration and management system and that may connect to any of the edge switch devices 204 and the core switch devices 206 via, for example, 10 gigabit Ethernet FCoE DELL® enhanced storage fabric converged edge device links available from DELL® Inc. of Round Rock, Tex., United States. As such, the Ethernet fabric 202 may be configured with SDN technology and functionality that interconnects the controller device 208 and any or all of the edge switch devices 204 and core switch devices 206, and allows the controller device 208 to manage and control the functionality of the edge switch devices 204 and core switch devices 206. However, the controller device 208 may be located outside of the Ethernet fabric 202, or even omitted from the Ethernet SAN system 200, while remaining within the scope of the present disclosure.

As discussed below, the teachings of the present disclosure include Ethernet switch devices that are configured to utilize L2 frames and perform the functionality discussed below to provide an enhanced Ethernet SAN, and the configuration of the Ethernet fabric 202 with the Ethernet switch devices of the present disclosure (referred to below as "participating Ethernet switch devices") may vary while still providing the benefits discussed below. For example, the participating Ethernet switch devices may be provided for each of the edge switch devices 204 in the Ethernet fabric 202, while the core switch devices 206 in the Ethernet fabric 202 may be provided by conventional Ethernet switch devices that do not include the functionality discussed below (referred to below as "non-participating Ethernet switch devices"). In another example, the participating Ethernet switch devices may be provided for each of the edge switch devices 204 and at least some of the core switch devices 206 in the Ethernet fabric 202, while non-participating Ethernet switch devices may be provided for the remaining core switch devices 206 in the Ethernet fabric 202. As discussed below, one of skill in the art in possession of the present disclosure will recognize how non-participating Ethernet switch devices may simply ignore many of the participating Ethernet switch device-specific frames that are exchanged to provide the benefits discussed below, thus acting as "pass-through" Ethernet switch devices that enable the Ethernet SAN functionality discussed below in an Ethernet fabric that is a mix of conventional/non-participating Ethernet switch devices and the participating Ethernet switch devices of the present disclosure. In another example, the participating Ethernet switch devices may be provided for all of the edge switch devices 204 and core switch devices 206 in the Ethernet fabric 202. As such, one of skill in the art in possession of the present disclosure will recognize that a wide variety of modification to the configuration of the Ethernet fabric 202 will fall within the scope of the present disclosure.

The Ethernet SAN system 200 also includes a plurality of initiator devices 210a, 210b, and up to 210c, each of which is coupled to the Ethernet fabric 202. The initiator devices 210a-c may include a variety of initiator devices such as, for example, one or more Fibre Channel (FC) initiator devices that may be provided in a rack mounted server with a host-bus adapter (HBA), one or more Fibre Channel over Ethernet (FCoE) initiator devices that may be provided in a rack mounted server with a converged network adapter (CNA), one or more Internet Small Computer System Interface (iSCSI) initiator devices that may be provided in a rack mounted server with a CNA, and/or other initiator devices known in the art. Each of the initiator devices 210a-c may be coupled to the Ethernet fabric 202 via one or more of the edge switch devices 204. For example, the FC initiator devices 210a-c may be coupled to the edge switch device(s) 204 via an 8 gigabit FC DELL® enhanced storage fabric converged edge device links (available from DELL® Inc. of Round Rock, Tex., United States) between their HBAs and device ports on the edge switch device(s) 204, and the FCoE and iSCSI initiator devices may be coupled to the edge switch device(s) 204 via 10 gigabit Ethernet DELL® enhanced storage fabric converged edge device links (available from DELL® Inc. of Round Rock, Tex., United States) between their CNAs and device ports on the edge switch device(s) 204, although other couplings are envisioned as falling within the scope of the present disclosure.

The Ethernet SAN system 200 also includes a plurality of target devices 212a, 212b, and up to 212c, each of which is coupled to the Ethernet fabric 202. The target devices 212a-c may include a variety of target devices such as, for example, one or more iSCSI storage systems that may be provided by the DELL® EQUALLOGIC® PS6110 storage system available from DELL® Inc. of Round Rock, Tex., United States; one or more FC storage systems with FC target adapters such as, for example, the DELL® POWERVAULT® storage system available from DELL® Inc. of Round Rock, Tex., United States; one or more FCoE storage systems with FCoE target adapters such as, for example, the DELL® COMPELLENT® SC6000 storage system available from DELL® Inc. of Round Rock, Tex., United States; combinations thereof; and/or other storage systems known in the art. Each of the target devices 212a-c may be coupled to the Ethernet fabric 202 via one or more of the edge switch devices 204, or one or more of the core switch devices 206. For example, the FC target devices may be coupled to the edge switch device(s) 204 or core switch devices(s) 206 via 8 gigabit FC DELL® enhanced storage fabric converged edge device links between their FC target adapters and device ports on edge switch device(s) 204 or core switch devices(s) 206, the iSCSI target devices may be coupled to the edge switch device(s) 204 or core switch devices(s) 206 via 10 gigabit iSCSI DELL® enhanced storage fabric converged edge device links to device ports on edge switch device(s) 204 or core switch devices(s) 206, and the FCoE target devices may be coupled to the edge switch device(s) 204 or core switch devices(s) 206 via 10 gigabit iSCSI DELL® enhanced storage fabric converged edge device links to device ports on edge switch device(s) 204 or core switch devices(s) 206, although other couplings are envisioned as falling within the scope of the present disclosure. While a specific Ethernet SAN system 200 has been illustrated and described, one of skill in the art in possession of the present disclosure will recognize that the teachings described herein will benefit a variety of Ethernet fabrics and SAN systems with a variety of different configurations, and thus those different configurations of Ethernet fabrics and SAN systems will fall within the scope of the present disclosure as well.

Figure 3:
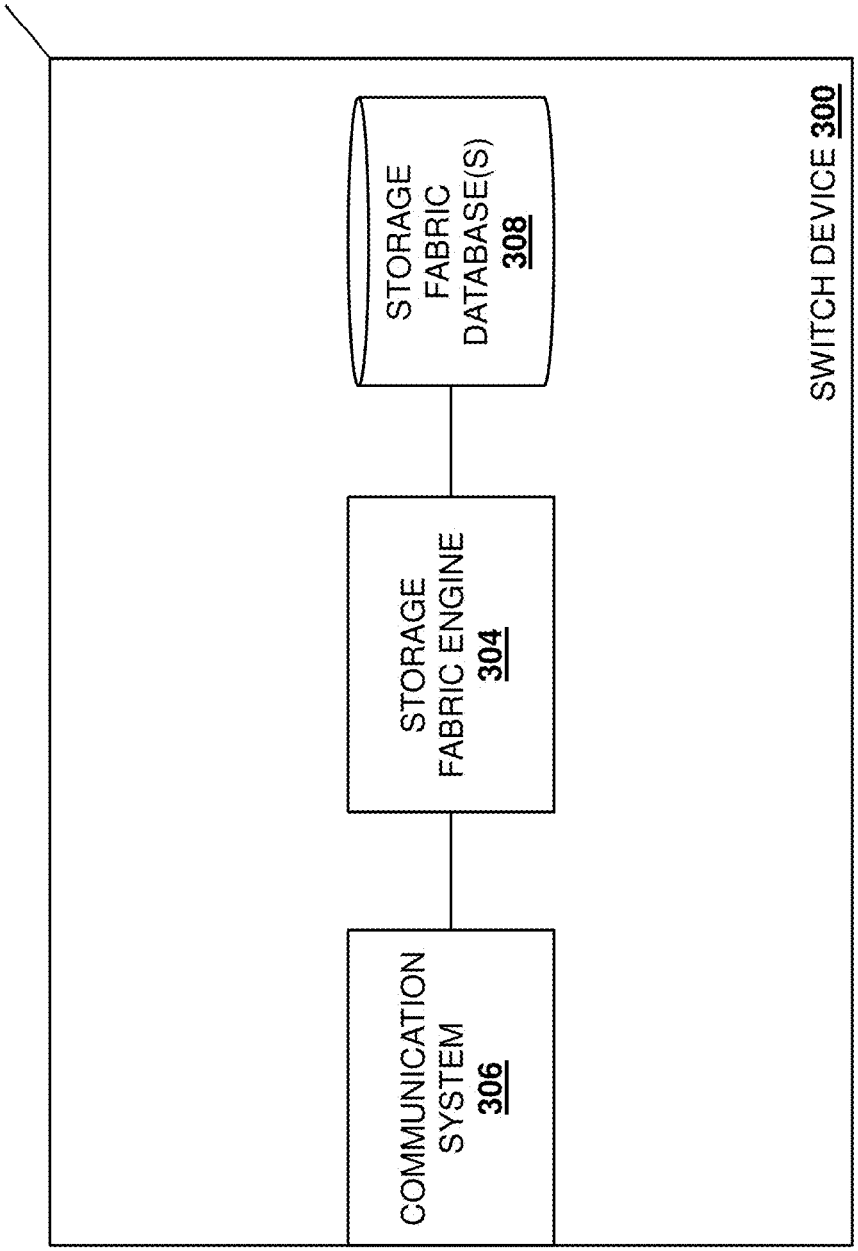
FIG. 3 is a schematic view illustrating an embodiment of a switch device used in the Ethernet SAN system of FIG. 2.

Referring now to FIG. 3, and embodiment of a switch device 300 is illustrated that, as discussed above, may be provided as any of the edge switch devices 204 and core switch devices 206 provided in the Ethernet fabric 202 discussed above with reference to FIG. 2. In the illustrated embodiment, the switch device 300 includes a chassis 302 that houses the components of the switch device 300, only some of which are illustrated in FIG. 3. For example, the chassis 302 may house an Ethernet processing system (not illustrated, but which may include one or more Ethernet switch chips) that is coupled to a memory system (not illustrated, but which may include one or more memory devices) that includes instructions that, when executed by the Ethernet processing system, provide a storage fabric engine 304 that is configured to perform the functions of the storage fabric engines and switch devices discussed below. The chassis 302 may also house a communication system 306 that is coupled to the storage fabric engine 304 (e.g., via a coupling between the processing system and the communication system) and that may include the inter-switch ports and device ports discussed above, as well as other components that enable the communications discussed below. The chassis 302 may also house a storage system (not illustrated, but which may include one or more storage devices) that is coupled to the storage fabric engine 304 (e.g., via a coupling between the processing system and the storage system) and that includes one or more of the storage fabric databases 308 discussed below. While specific components for the switch device 300 are illustrated and described, one of skill in the art in possession of the present disclosure will recognize that a variety of other components may be housed in the chassis 302 and utilized to provide a variety of conventional switch functionality known in the art while remaining within the scope of the present disclosure.

As discussed above, in some examples, the switch device 300 may be considered a participating Ethernet switch device that may be provided for each of the edge switch devices 204 in the Ethernet fabric 202, while non-participating Ethernet switch devices may be provided as the core switch devices 206 in the Ethernet fabric 202. In other examples, the switch device 300 may be considered a participating Ethernet switch device that may be provided for each of the edge switch devices 204 and at least some of the core switch devices 206 in the Ethernet fabric 202, while non-participating Ethernet switch devices may be provided as the remaining core switch devices 206 in the Ethernet fabric 202. In yet other examples, the switch device 300 may be considered a participating Ethernet switch device that may be provided for all of the edge switch devices 204 and the core switch devices 206 in the Ethernet fabric 202. In an embodiment, the functionality of the switch device 300 may different depending on the functionality of an initiator device 208a-c or target device 210a-c that is coupled to the switch device 300 via the communication system 304. For example, when the switch device 300 is coupled to an iSCSI initiator or target device, or an FCoE initiator or target device, the switch device 300 may enable the functionality discussed below using the storage fabric engine 304 provided by the Ethernet processing system, the communication system 306, and the storage fabric database(s) 308.

However, when the switch device 300 is coupled to an FC initiator or target device, the switch device 300 may enable the functionality discussed below using the teachings of U.S. patent application Ser. No. 14/295,999, entitled Fiber Channel Gateway System, filed on Jun. 4, 2014; and U.S. patent application Ser. No. 14/937,590, entitled Fiber Channel Gateway System, filed on Nov. 10, 2015, the disclosures of which are incorporated by referenced in their entirety. Those disclosures describe a less complex and less expensive FC gateway that is configured to establish communication with an FC SAN, provide for the logging in of one or more servers, and discover FC devices in the SAN so that the servers may communicate with those FC devices. As discussed in those disclosures, the FC gateway provides an FC NPIV gateway in which all FIP traffic (e.g., VLAN request/notification, discovery solicitation/advertisement, FIP fabric login/fabric discovery, accepts, etc.) from servers communicating using FCoE is handled by a fabric services engine that operates on the FC gateway and that also handles, for example, FIP FCoE link maintenance (e.g., FKA, discovery adjustment, CVL, FIP LOGO, etc.). Furthermore, all FCoE communications may be passed through the FC NPIV gateway and have their FCoE headers stripped off on the way to an FCoE/FC encapsulator/decapsulator (i.e., converter) such that native FC communications are sent on to an upstream NPIV port on the FC SAN fabric, and all incoming FC communications may be wrapped in an FCoE header by the fabric services engine and handled by an Ethernet processing system (e.g., an Ethernet switch chip).

Figure 4:
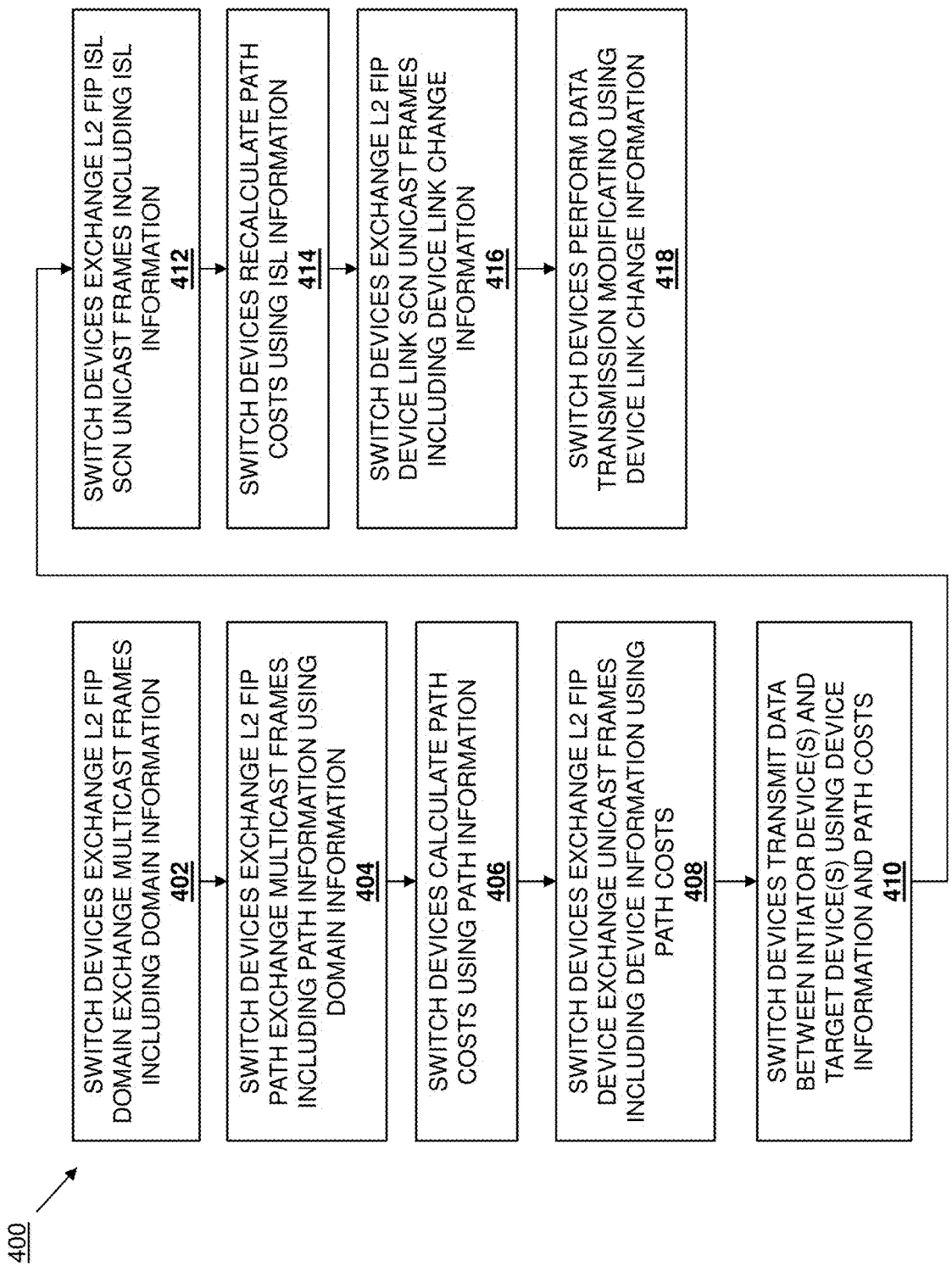
FIG. 4 is a flow chart illustrating an embodiment of a method for providing an Ethernet SAN system.

Referring now to FIG. 4, an embodiment of a method 400 for providing an Ethernet SAN system is illustrated. As discussed below, in some embodiments the systems and methods of the present disclosure allow for a storage-hardened, storage-protocol-aware, agnostic Ethernet SAN fabric with deterministic link topology, deterministic flow control, and distributed state change notifications. For example, the use of "SAN-aware" edge switch devices that include built-in storage intelligence and awareness along with remote control capability via SDN, vendor unique FIP/FCoE frames that flow between switch devices that provide an FCoE Ethernet fabric, and link establishment and control frames to control the state of the Ethernet fabric, enable a deterministic link topology, a deterministic link state awareness, link state change propagation/notification, rapid error recovery, and highly reliable frame delivery in an Ethernet fabric provided by relatively inexpensive and highly available Ethernet switch chip enabled switch devices. As such, one of skill in the art in possession of the present disclosure will recognize how the teachings below provide for an Ethernet-based SAN with FC-SAN-like attributes.

The method 400 begins at block 402 where switch devices exchange layer-2 (L2) Fabric Initiation Protocol (FIP) domain exchange multicast frames that include domain information. As discussed above, conventional Ethernet fabrics do not provide a deterministic fabric membership process for initiator devices, target devices, or switch devices, resulting in an indeterministic fabric topology that prevents SAN administrators from viewing the SAN end-to-end. The method 400 allows the Ethernet fabric 202 to remedy that issue, at least in part, by the exchange of the L2 FIP domain exchange multicast frames at block 402. In an embodiment, at block 402 the participating Ethernet switch devices in the Ethernet fabric 202 (e.g., any of the edge switch devices 204 and core switch devices 206 provided by the switch device 300) create and exchange L2 FIP domain exchange multicast frames. For example, the storage fabric engine 304 in the switch device 300 may create an L2 FIP domain exchange multicast frame that includes domain information for that switch device 300 that may be retrieved from the storage fabric database(s) 308, and then flood the L2 FIP domain exchange multicast frame to each of its inter-switch ports in the communication system 306.

Figure 5A:
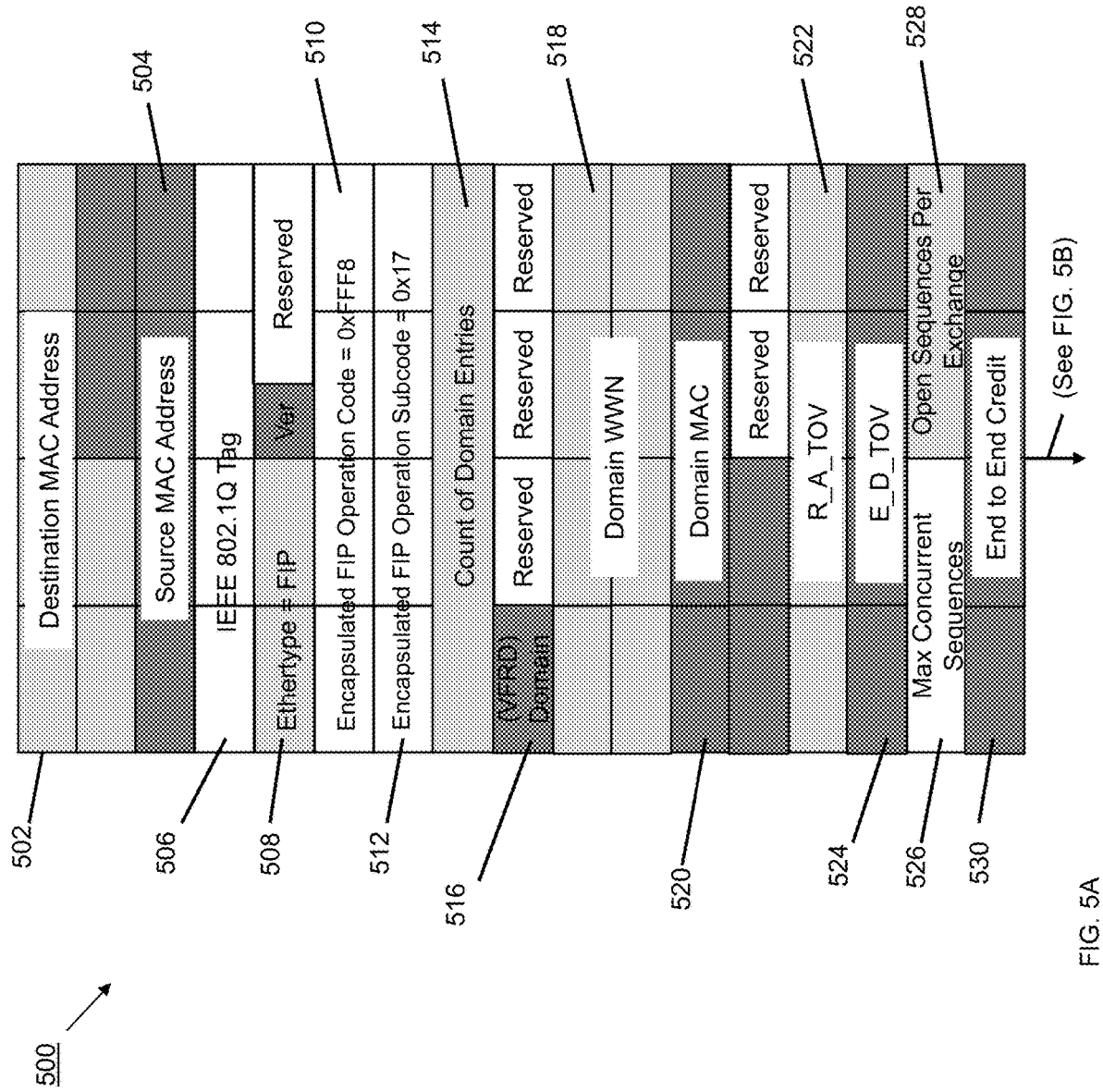
FIG. 5A is a schematic view illustrating an embodiment of a portion of a Layer-2 (L2) Fabric Initialization Protocol (FIP) domain exchange multicast frame.
Figure 5B:
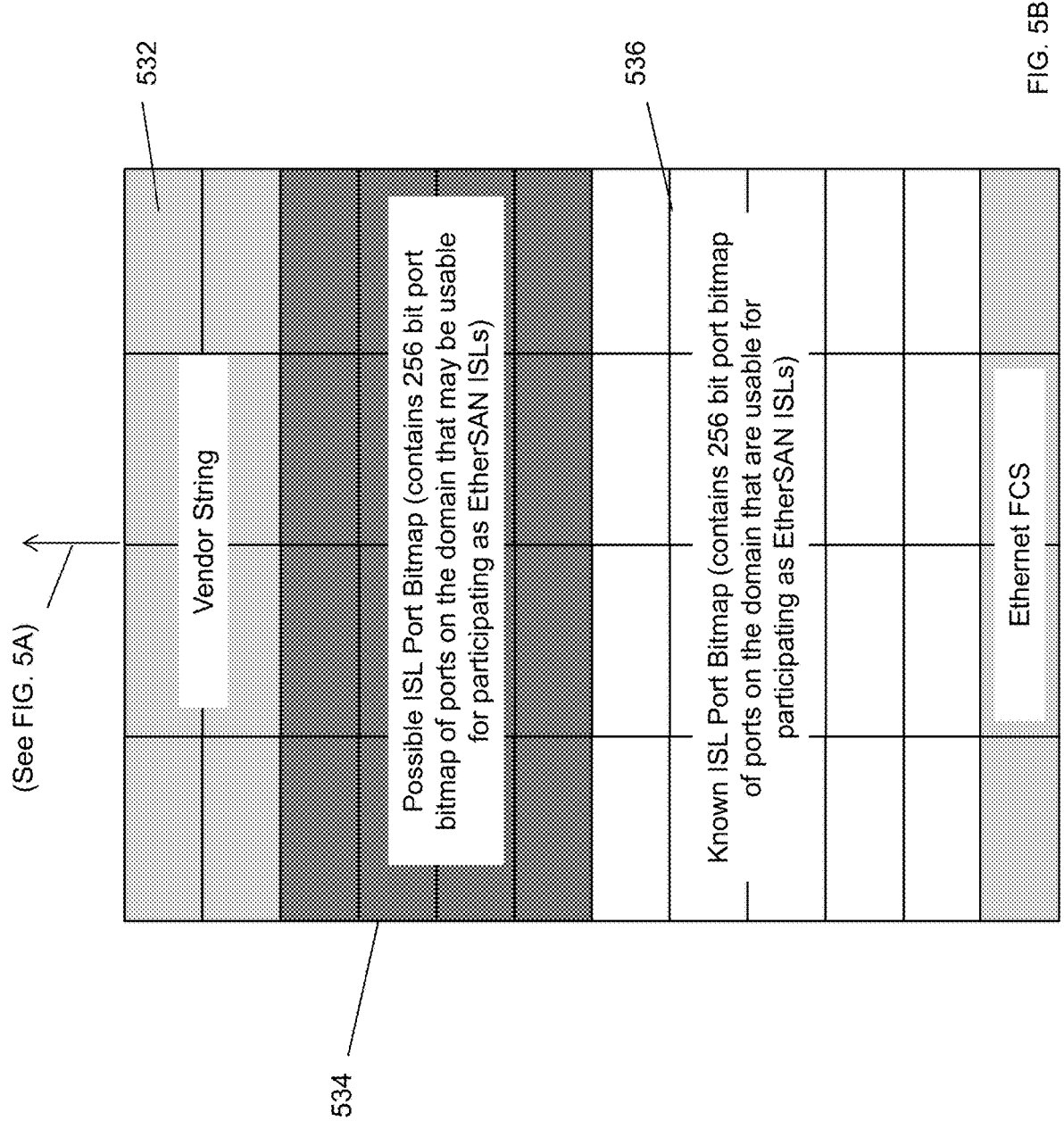
FIG. 5B is a schematic view illustrating an embodiment of a portion of the L2 FIP domain exchange multicast frame of FIG. 5B.

FIGS. 5A and 5B illustrate an embodiment of an L2 FIP domain exchange multicast frame 500 that may be created, sent, and received by the switch devices at block 402. In an embodiment, the L2 FIP domain exchange multicast frame 500 may be an FIP unsolicited discovery advertisement multicast frame. In the illustrated example, the L2 FIP domain exchange multicast frame 500 includes a destination Media Access Control (MAC) address section 502, a source MAC address section 504, an institute of Electrical and Electronics Engineers (IEEE) 802.1Q tag section 506, an Ethertype section 508, an encapsulated FIP operation code section 510, an encapsulated FIP operation subcode section 512, a domain entries count section 514, a Virtual Fabric Routing Domain (VFRD) domain entry section 516, a domain World Wide Name (WWN) section 518, a domain MAC section 520, a Resource Allocation Timeout Value (R_A_TOV) section 522, an Error Detect TimeOut Value (E_D_TOV) section 524, a maximum concurrent sequences section 526, an open sequences per exchange section 528, an end-to-end credit section 530, a vendor string section 532, a possible ISL port bitmap section 534, and a known ISL port bitmap section 536. However, other sections may be provided in the frame 500 while remaining within the scope of the present disclosure.

In an embodiment, at block 402 the storage fabric engine 304 in the switch device 300 may create the L2 FIP domain exchange multicast frame 500 by providing an ethertype (e.g., "FIP" in the illustrated embodiment) in the ethertype section 508, providing an operation code (e.g., "0×FFF8", a vendor specific operation code, in the illustrated embodiment) in the encapsulated FIP operation code section 510, and providing an operation subcode (e.g., "0×17", a reserved operation subcode, in the illustrated embodiment) in the encapsulated FIP operation subcode section 512. As would be understood by one of skill in the art in possession of the present disclosure, the ethertype, operation code, and operation subcode allow participating Ethernet switch devices receiving the L2 FIP domain exchange multicast frame 500 to build up a map of the participating domains (e.g., Ethernet switch devices) in the Ethernet fabric (e.g., an FC overlaid fabric). In addition, at block 402 the storage fabric engine 304 in the switch device 300 may provide domain information in the L2 FIP domain exchange multicast frame 500 by providing, for example, a domain entry count in the domain entries count section 514, and then associating that domain entry count with a VFRD in the VFRD entry section 516, a domain WWN in the domain WWN section 518, a domain MAC in the domain MAC section 520, an R_A_TOV in the Resource Allocation Timeout Value (R_A_TOV) section 522, an E_D_TOV in the E_D_TOV section 524, sequence and exchange parameters in the maximum concurrent sequences section 526 and the open sequences per exchange section 528, credit information in an end-to-end credit section 530, vendor information in a vendor string section 532, and ISL port bitmaps in the possible ISL port bitmap section 534 and the known ISL port bitmap section 536.

In some embodiments, the VFRD provided in the VFRD entry section 516 may be provided according to the teachings of U.S. patent application Ser. No. 14/860,354, attorney docket no. 16356.1761US01, entitled FCoE Frame Forwarding System, filed on Sep. 21, 2015, the disclosure of which is incorporated by reference in its entirety. The techniques discussed in that disclosure provide for the forwarding of FCoE frames using a non-FCoE-enabled processing system and that allows for the use of L3 forwarding tables that result in the ability to provide much larger FCoE network fabrics than could be previously realized using non-FCoE-enabled processing systems. This is accomplished, at least in part, by providing L3 forwarding table reference information in FCoE frame locations that correspond to standard IP frame locations in an IP frame, and that L3 forwarding table reference information may be retrieved from the FCoE frame locations, interpreted by the non-FCoE-enabled processing system as information retrieved from an IP frame, and used to reference a specialized L3 forwarding table and determine an entry in that specialized L3 forwarding table that provides forwarding information for the FCoE frame (e.g., an egress port and a destination MAC address). As such, the number of values allowable in the standard IP frame locations such as the source IP B3 field, destination IP B0 field, and destination IP B1 field, provide for 243 VFRD tables and 65535 entries in each VFRD table, resulting in almost 16 million possible next hops via the VFRD tables, providing substantial increases in FCoE network fabric size may be realized along with the utilization of non-FCoE-enabled processing systems that substantially reduce the costs of those FCoE network fabrics.

As would be understood by one of skill in the art in possession of the present disclosure, the domain information that is provided in the L2 FIP domain exchange multicast frame 500 provides information that describes each "FC style" Ethernet switch domain that is part of the participating domain membership in the fabric for the switch device creating that L2 FIP domain exchange multicast frame 500. At block 402, following the creation of the L2 FIP domain exchange multicast frame 500, the switch device 300 then floods that L2 FIP domain exchange multicast frame 500 to each of its inter-switch ports in the communication system 306. Thus, at block 402, any or all of the participating Ethernet switch devices in the Ethernet fabric 202 may flood L2 FIP domain exchange multicast frames to each of its inter-switch ports and to the Ethernet fabric 202 at block 402.

Furthermore, at block 402, the storage fabric engine 304 in the switch device 300 may also receive one or more L2 FIP domain exchange multicast frames 500 through the communication system 306 (e.g., via ISLs coupled to their inter-switch ports) from other participating Ethernet switch devices in the Ethernet fabric 202, and those L2 FIP domain exchange multicast frames may include domain information associated with those switch devices as discussed above. In response to receiving the L2 FIP domain exchange multicast frames 500 from other switch devices in the Ethernet fabric 202, the storage fabric engine 304 may then respond to those L2 FIP domain exchange multicast frame(s) by providing the domain information for the switch device 300 in each of those L2 FIP domain exchange multicast frame(s) by, for example, providing an incremented domain entry count in the count of domain entries section 514, and then associating that incremented domain entry count with a VFRD in the VFRD entry section 516, a domain WWN in the domain WWN section 518, a domain MAC in the domain MAC section 520, an R_A_TOV in the Resource Allocation Timeout Value (R_A_TOV) section 522, an E_D_TOV in the E_D_TOV section 524, sequence and exchange parameters in the maximum concurrent sequences section 526 and the open sequences per exchange section 528, credit information in an end-to-end credit section 530, vendor information in a vendor string section 532, and ISL port bitmaps in the possible ISL port bitmap section 534 and the known ISL port bitmap section 536. After providing its domain information in a received L2 FIP domain exchange multicast frame, the storage fabric engine 304 may then send that L2 FIP domain exchange multicast frame back to the participating Ethernet switch device from which it was received.

As such, the storage fabric engine 304 in the switch device 300 may also receive replies through the communication system 306 to L2 FIP domain exchange multicast frames 500 that it previously sent as discussed above. In response to receiving a reply to a previously sent L2 FIP domain exchange multicast frame, the storage fabric engine 304 may copy any domain information that was provided in the L2 FIP domain exchange multicast frame by another switch device, store that domain information in the storage fabric database(s) 308, and then again flood that L2 FIP domain exchange multicast frame through each of its inter-switch ports in the communication system 306. As such, the participating Ethernet switch devices in the Ethernet fabric 202 may continue to exchange the L2 FIP domain exchange multicast frames in order to allow each participating Ethernet switch device to build up one or more databases of potential domains (i.e., participating Ethernet switch devices) and their operating characteristics (as provided in the domain information) in the Ethernet fabric 202. As would be understood by one of skill in the art in possession of the present disclosure, non-participating Ethernet switch devices in the Ethernet fabric 202 may ignore the FIP domain exchange multicast frames exchanged at block 402 and simply forward them as performed with any other valid L2 frame. The build-up of the potential domains and their operating characteristics allows each participating Ethernet switch device in the Ethernet fabric 202 to learn of the other participating Ethernet switch devices in the Ethernet fabric 202, how they are connected to those other participating Ethernet switch devices via ISLs provided by their inter-switch ports, and endpoints (e.g., the initiator device(s) 210a-c or target device(s) 212a-c) connected to those participating Ethernet switch devices, as well as provides for the determination of paths between initiator devices 210a-c and target devices 212a-c as discussed below.

The method 400 then proceeds to block 404 where switch devices use the domain information to exchange L2 FIP path exchange multicast frames that include path information. As discussed above, conventional Ethernet fabrics do not provide deterministic paths between endpoint devices (e.g., the initiator device(s) 210a-c or target device(s) 212a-c) or switch devices and, as such, the path traversed by any particular data frame through the Ethernet fabric 202 is indeterminate. The method 400 allows the Ethernet fabric 202 to remedy that issue, at least in part, by the exchange of the L2 FIP path exchange multicast frames at block 404. In an embodiment, at block 404 the participating Ethernet switch devices in the Ethernet fabric 202 (e.g., any of the edge switch devices 204 and core switch devices 206 provided by the switch device 300) create and exchange L2 FIP path exchange multicast frames based on the domain information that was received at block 402. For example, the storage fabric engine 304 in the switch device 300 may create an L2 FIP path exchange multicast frame that includes path information for that switch device 300 that may be retrieved from the storage fabric database(s) 308, and then flood the L2 FIP domain exchange multicast frame to each of its inter-switch ports in the communication system 306 that is connected to another participating Ethernet switch device as per the domain information received at block 402.

Figure 6A:
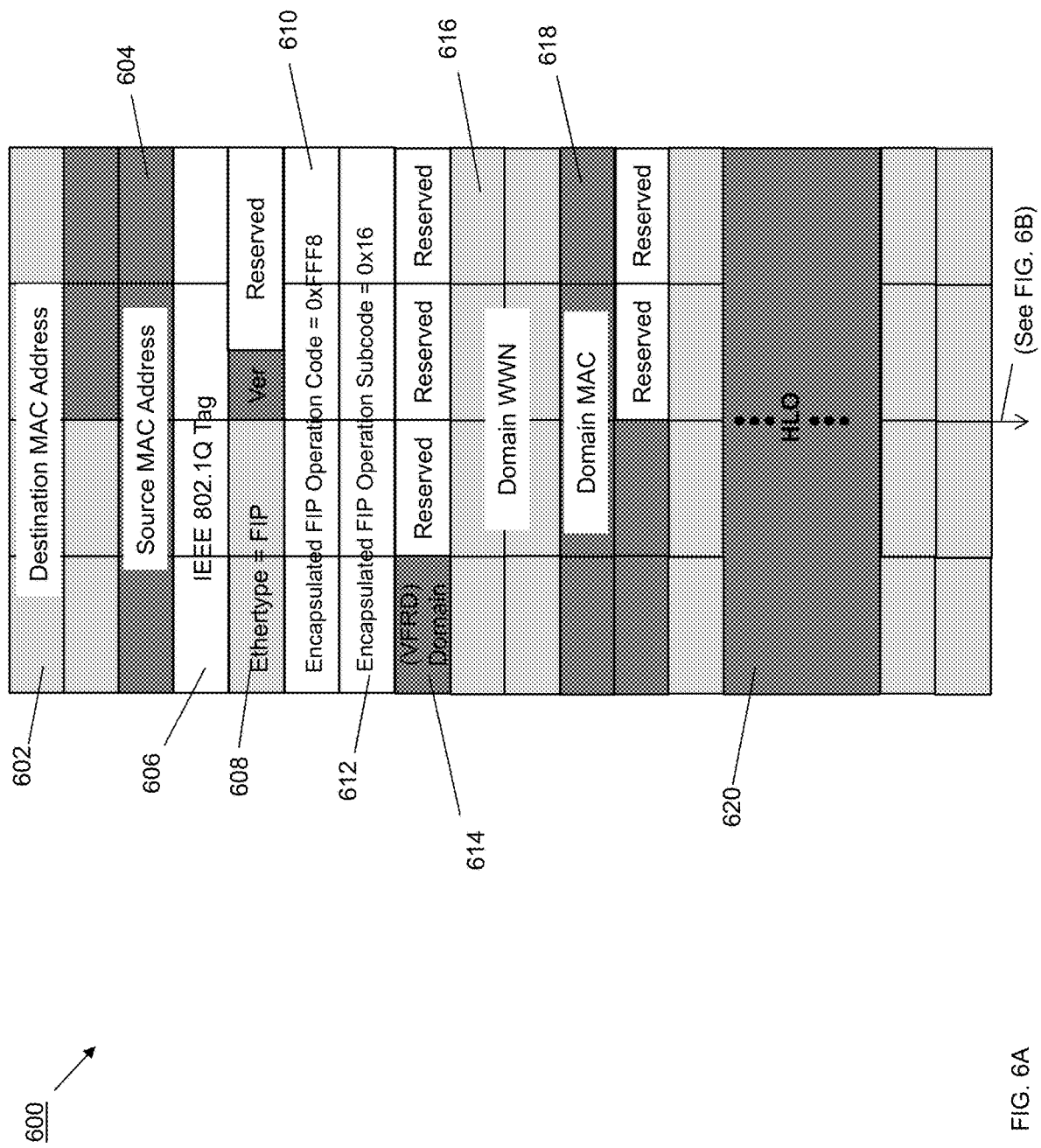
FIG. 6A is a schematic view illustrating an embodiment of a portion of an L2 FIP path exchange multicast frame.
Figure 6B:
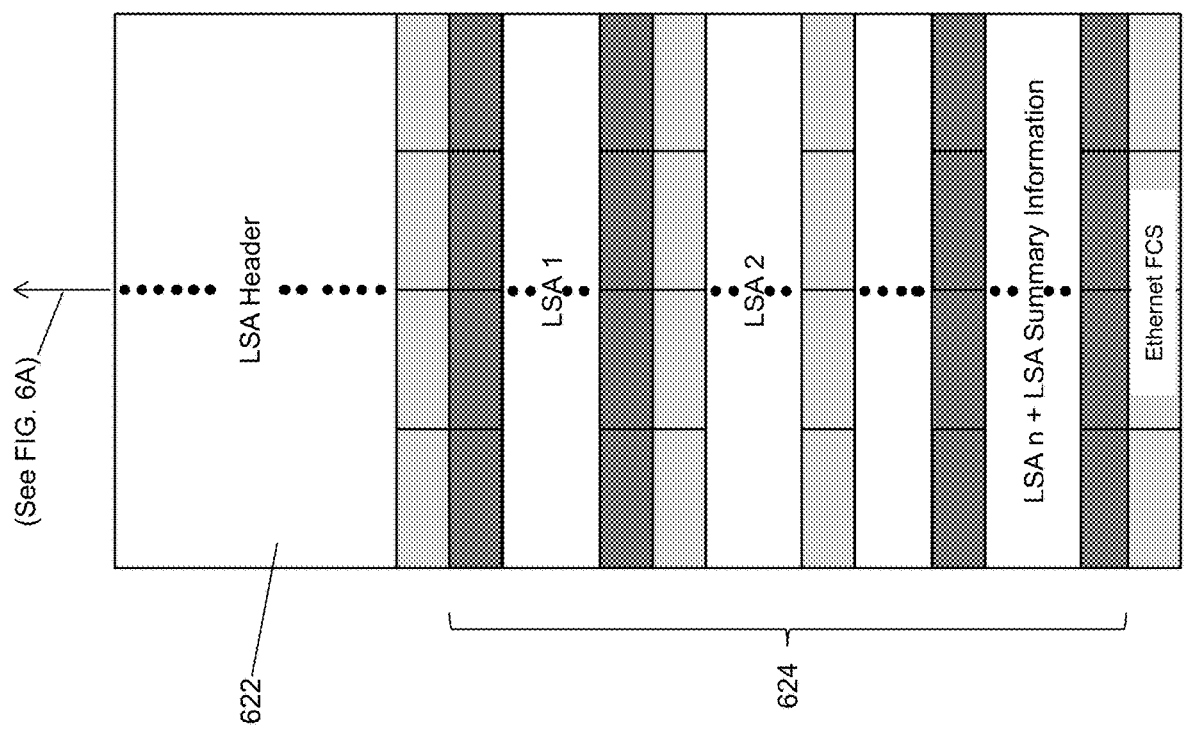
FIG. 6B is a schematic view illustrating an embodiment of a portion of the L2 FIP path exchange multicast frame of FIG. 6A.

FIGS. 6A and 6B illustrate an embodiment of an L2 FIP path exchange multicast frame 600 that may be created, sent, and received by the switch devices at block 404. In an embodiment, the L2 FIP path exchange multicast frame 600 may be an FIP unsolicited discovery advertisement multicast frame. In the illustrated example, the L2 FIP path exchange multicast frame 600 includes a destination MAC address section 602, a source MAC address section 604, an IEEE 802.1Q tag section 606, an Ethertype section 608, an encapsulated FIP operation code section 610, an encapsulated FIP operation subcode section 612, a VFRD entry section 614, a domain WWN section 616, a domain MAC section 618, a HLO message section 620, a Link State Advertisement (LSA) header section 622, and an LSA section 624. However, other sections may be provided in the frame 600 while remaining within the scope of the present disclosure.

In an embodiment, at block 404 the storage fabric engine 304 in the switch device 300 may create the L2 FIP path exchange multicast frame 600 by providing an ethertype (e.g., "FIP" in the illustrated embodiment) in the ethertype section 608, providing an operation code (e.g., "0xFFF8", a vendor specific operation code, in the illustrated embodiment) in the encapsulated FIP operation code section 610, and providing an operation subcode (e.g., "0x16", a reserved operation subcode, in the illustrated embodiment) in the encapsulated FIP operation subcode section 612. As would be understood by one of skill in the art in possession of the present disclosure, the ethertype, operation code, and operation subcode allow switch devices receiving the L2 FIP path exchange multicast frame 600 to exchange least cost path information about ports connected between all participating Ethernet switch devices. In addition, at block 404 the storage fabric engine 304 in the switch device 300 may provide path information in the L2 FIP path exchange multicast frame 600 by, for example, providing a VFRD in the VFRD entry section 614, a domain WWN in the domain WWN section 616, a domain MAC in the domain MAC section 618, a HLO message in the HLO message section 620, an LSA header in the LSA header section 622, and LSA information in the LSA section 624. Similarly as discussed above, the VFRD provided in the VFRD entry section 614 may be provided according to the teachings of U.S. patent application Ser. No. 14/860,354, attorney docket no. 16356.1761US01, entitled FCoE Frame Forwarding System, filed on Sep. 21, 2015, the disclosure of which is incorporated by reference in its entirety.

As would be understood by one of skill in the art in possession of the present disclosure, the path information that is provided in the L2 FIP path exchange multicast frame 600 provides information that describes the least hop cost links providing 1) paths between each of the switch devices and other switch devices (e.g., via ISLs coupled to inter-switch ports), and 2) paths between the switch devices and link endpoint devices (e.g., via device links between device ports and initiator devices 210a-c or target devices 212a-c). The participating Ethernet switch device creating the L2 FIP path exchange frame may fills in its own domain's known link path cost information, add it to the known link path cost information for all other frames received so far, and flood that frame back out to all other participating Ethernet switch devices/domains. At block 404, following the creation of the L2 FIP path exchange multicast frame 600, the switch device 300 then floods that L2 FIP path exchange multicast frame 600 to each of its inter-switch ports in the communication system 306 that is connected to another participating Ethernet switch device (as described in the domain information received at block 402). Thus, any or all of the participating Ethernet switch devices in the Ethernet fabric 202 may provide L2 FIP path exchange multicast frames to others of the participating Ethernet switch devices in the Ethernet fabric 202 at block 404.

Furthermore, at block 404, the storage fabric engine 304 in the switch device 300 may also receive one or more L2 FIP path exchange multicast frames 600 through the communication system 306 (e.g., via ISLs coupled to their inter-switch ports) from other switch devices in the Ethernet fabric 202, and those L2 FIP path exchange multicast frame(s) may include path information associated with those switch devices as discussed above. In response to receiving the L2 FIP path exchange multicast frames 600 from other switch devices in the Ethernet fabric 202, the storage fabric engine 304 may create and build a link state database in the storage fabric database(s) 308 by adding the path information in the L2 FIP path exchange multicast frame 600 to that link state database. Furthermore, the storage fabric engine 304 may also respond to those L2 FIP path exchange multicast frame(s) by providing their path information in each of those L2 FIP path exchange multicast frame(s) by, for example, providing an LSA header in the LSA header section 622, and LSA information in the LSA section 624. After providing its path information in a received L2 FIP path exchange multicast frame, the storage fabric engine 304 may then send that L2 FIP path exchange multicast frame back to the participating Ethernet switch device from which it was received.

As such, the storage fabric engine 304 in the switch device 300 may also receive replies through the communication system 306 to L2 FIP path exchange multicast frames 600 that it previously sent as discussed above. In response to receiving a reply to a previously sent L2 FIP path exchange multicast frame, the storage fabric engine 304 may copy any path information provided in that L2 FIP path exchange multicast frame by another switch device to the link state database it created in storage fabric database(s) 308, update the L2 FIP path exchange multicast frame 600, and then again flood that L2 FIP path exchange multicast frame through each of its inter-switch ports in the communication system 306 that is connected to another participating Ethernet switch device (as per the domain information received at block 402). As such, the participating Ethernet switch devices in the Ethernet fabric 202 may continue to exchange the L2 FIP path exchange multicast frames in order to allow each participating Ethernet switch device to build up their link state databases, and may determine that those link state databases are complete when received L2 FIP path exchange multicast frames no longer include any new path information that is not already incorporated into their link state database. As would be understood by one of skill in the art in possession of the present disclosure, non-participating Ethernet switch devices in the Ethernet fabric 202 may ignore the FIP domain exchange multicast frames exchanged at block 402 and simply forward them as performed with any other valid L2 frame. The building of the link state databases allows each participating Ethernet switch device in the Ethernet fabric 202 to learn of the paths available via other participating Ethernet switch devices in the Ethernet fabric 202, and provides for the determination of path costs through the Ethernet fabric 202 as discussed below.

The method 400 then proceeds to block 406 where switch devices calculate path costs using the path information. In an embodiment, each of the participating Ethernet switch devices in the Ethernet fabric 202 may use the path information received at block 404 to calculate path costs of different paths through the Ethernet fabric 202. For example, at block 406, the storage fabric engine 304 may access the link state database it created at block 404 and perform a path cost algorithm in order to determine a plurality of path costs. In a specific example, the path cost algorithm may be a Fabric Shortest Path First (FSPF) algorithm, which may be provided by a modified version of the Dijsktra algorithm used in the Open Shortest Path First (OSPF) algorithm, in order to determine all paths through the Ethernet fabric 202 including the least cost paths between all members of the Ethernet fabric 202.

The FSPF algorithm is limited in scale by limits it imposes on hop count in order to provide for quicker completion of the algorithm and quicker knowledge of all fabric paths, but these scaling limitations are not significant in its use with the Ethernet SAN system 200. Storage network membership is traditionally much smaller than worldwide internet node and device network membership (which OSPF addresses) by several orders of magnitude, and the creation and use of the VFRDs discussed above allow for all of the control traffic to be exchanged at the L2 Ethernet level using the first byte of the FCID for the creation of each VFRD. Even when limiting the scale of the Ethernet fabric to 242 VFRDs (i.e., the maximum number of physical domains allowed in the FC protocol), this still allows a single Ethernet fabric membership of 15,859,712 potential devices (i.e., 242×256×256). Furthermore, by limiting the virtual hop count to between six and eight hops, the determination of the shortest paths between all devices can still be accomplished in low second (e.g., 1-10 seconds) or sub-second times even on older processor technologies. It is noted that a "hop" in this discussion may be considered a virtual path between participating Ethernet switch devices in the Ethernet fabric, and L2 control plane traffic routed across non-participating Ethernet switch devices would not be counted as a hop for the initial static FSPF weighting. However, while a specific example using the FSPF algorithm has been described, other path cost algorithms may fall within the scope of the present disclosure as well.

Following block 406, each of the participating Ethernet switch devices in the Ethernet fabric 202 has determined the path costs for paths through the Ethernet fabric 202, thus providing an initial buildup of a deterministic end-to-end topology that includes the path costs for any path data frames may take through the Ethernet fabric 202 using L2 Ethernet prior to any data being sent through the Ethernet fabric 202. As such, the best paths (e.g., least cost paths) between each of the initiator devices 210a-c and the target devices 212a-c are known following block 406 and prior to the initiation of data communications between the initiator devices 210a-c and the target devices 212a-c via the Ethernet fabric 202.

The method 400 then proceeds to block 408 where switch devices exchange L2 FIP device exchange unicast frames that include device information using the path costs. As discussed above, conventional Ethernet fabrics allow devices to be connected to and unconnected from the Ethernet fabric with little to no effort to authenticate those devices or keep track of which devices are connected to the Ethernet fabric, which can be problematic for use with SANs that store and transmit sensitive information. The method 400 allows the Ethernet fabric 202 to remedy that issue, at least in part, by requiring that endpoint devices login to the participating Ethernet switch devices at block 408. In an embodiment, following the determination of path costs at block 406, at block 408 any of the participating Ethernet switch devices connected to an endpoint device (e.g., the initiator devices 210a-c or target devices 212a-c) may perform a login process with those endpoint device(s), receive device information from those endpoint device(s), and then create and exchange L2 FIP device exchange unicast frames based on the device information that was received at block 408.

In an embodiment, at block 408 the storage fabric engine 304 in the switch device 300 may communicate via the device ports in the communication system 306 and over device link(s) with any directly connected initiator device 210a-e or target device 212a-e to perform a login process. For example, the login process may be a protocol agnostic virtual device link endpoint login and registration process that will treat different types of devices (e.g., the FC devices, FCoE devices, and iSCSI devices discussed above) the same for the purposes of device fabric login, device name server registration, and device zoning membership. In a specific example, the login performed at block 408 may be an "FC style" login (e.g., similar to a FLOGI/FDISC in FC systems). However, other login process may fall within the scope of the present disclosure as well. During the login process, the endpoint device logging into the participating Ethernet switch device may provide device information through the communication system 308 to the storage fabric engine 304, and the storage fabric engine 304 may store that device information in the storage fabric database(s) 308. For example, the device information may include name server information (e.g., name server entries) for that endpoint device, zone information for that endpoint device, and/or any other information that one of skill in the art in possession of the present disclosure would recognize would enable the functionality discussed below.

Furthermore, at block 408 the storage fabric engine 304 in the switch device 300 may create an L2 FIP device exchange unicast frame that includes the device information it received from the endpoint device(s), and then send the L2 FIP device exchange unicast frame along each of the best paths (e.g., least cost paths) through the Ethernet fabric 202 that were determined at block 406. One of skill in the art in possession of the present disclosure will recognize that L2 FIP device exchange unicast frames may be created and sent as discussed below anytime an endpoint device logs into a participating Ethernet switch device.

Figure 7A:
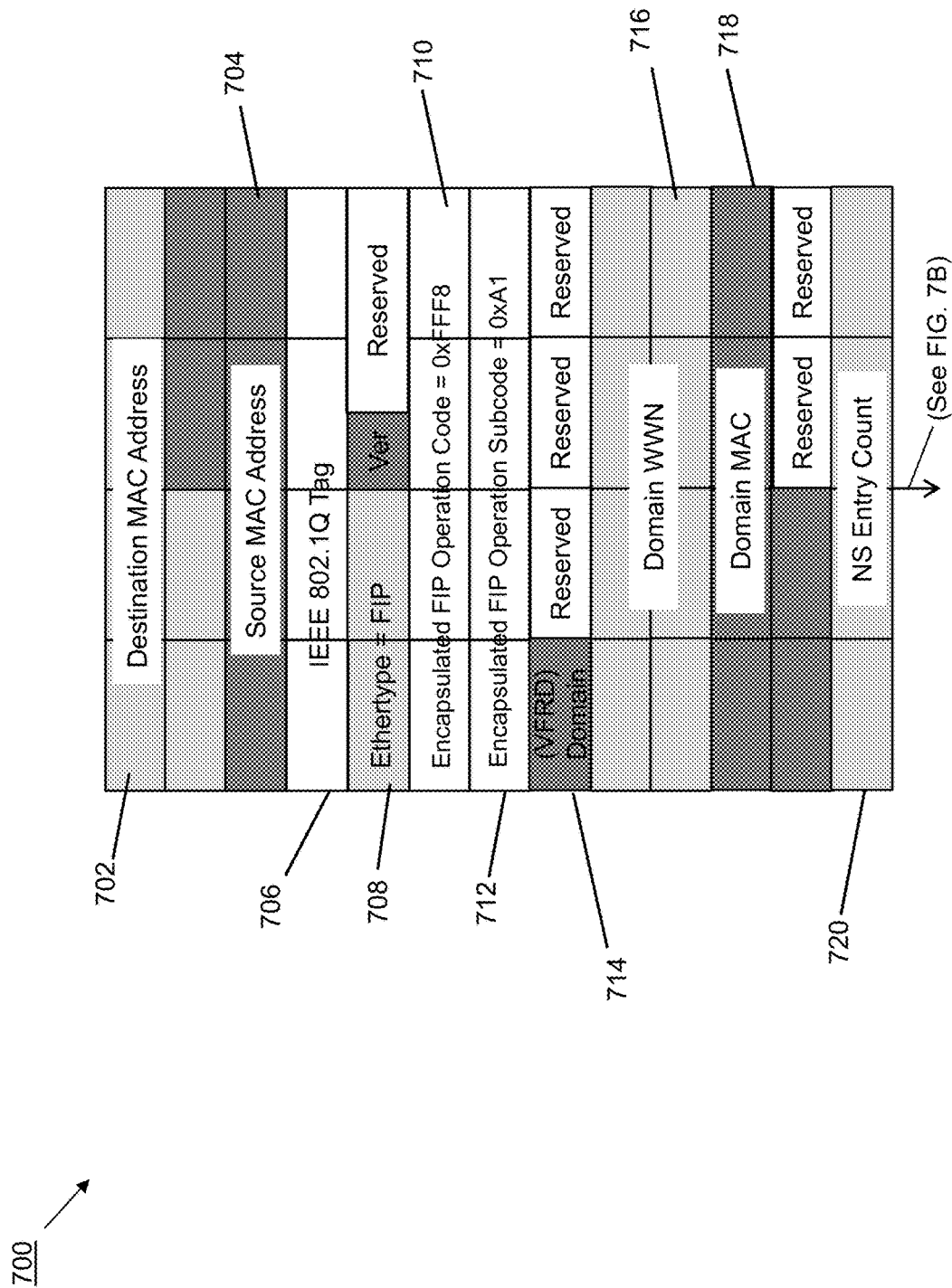
FIG. 7A is a schematic view illustrating an embodiment of a portion of an L2 FIP device exchange unicast frame.
Figure 7B:
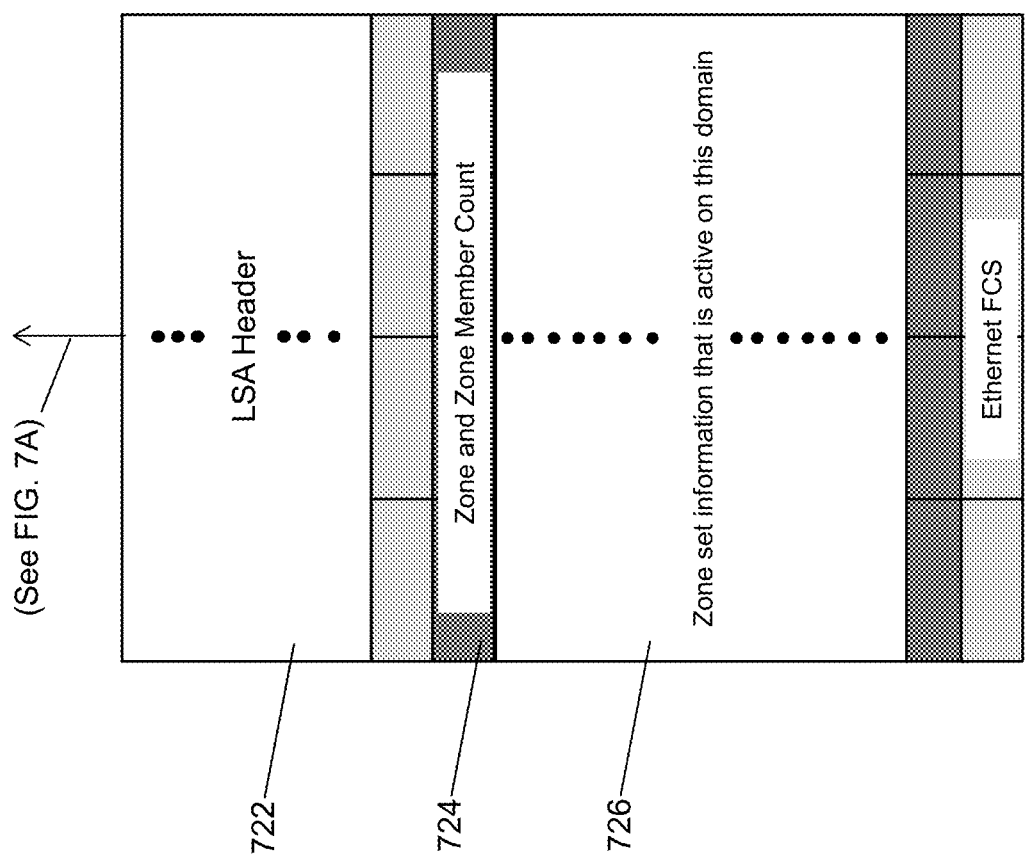
FIG. 7B is a schematic view illustrating an embodiment of a portion of the L2 FIP device exchange unicast frame of FIG. 7A.

FIGS. 7A and 7B illustrate an embodiment of an L2 FIP device exchange unicast frame 700 that may be created, sent, and received by the switch devices at block 408. In an embodiment, the L2 FIP device exchange unicast frame 700 may be a FIP unicast frame. In the illustrated example, the L2 FIP device exchange unicast frame 700 includes a destination MAC address section 702, a source MAC address section 704, an IEEE 802.1Q tag section 706, an Ethertype section 708, an encapsulated FIP operation code section 710, an encapsulated FIP operation subcode section 712, a VFRD entry section 714, a domain WWN section 716, a domain MAC section 718, a name server (NS) entry count section 720, a name server information section 722, a zone and zone member count section 724, and a zone information section 726. However, other sections may be provided in the frame 700 while remaining within the scope of the present disclosure.

In an embodiment, at block 408 the storage fabric engine 304 in the switch device 300 may create the L2 FIP device exchange unicast frame 700 by providing an ethertype (e.g., "FIP" in the illustrated embodiment) in the ethertype section 708, providing an operation code (e.g., "0xFFF8", a vendor specific operation code, in the illustrated embodiment) in the encapsulated FIP operation code section 710, and providing an operation subcode (e.g., "0xA1", a reserved operation subcode, in the illustrated embodiment) in the encapsulated FIP operation subcode section 712. As would be understood by one of skill in the art in possession of the present disclosure, the ethertype, operation code, and operation subcode allow switch devices receiving the L2 FIP device exchange unicast frame 700 to determine information about endpoint devices logged into other participating Ethernet switch devices/domains, add that information to the name server database of the receiving switch, and apply the proper zoning restrictions based on the device exchange frame zoning map information. In addition, at block 408 the storage fabric engine 304 in the switch device 300 may provide device information in the L2 FIP device exchange unicast frame 700 by, for example, providing a VFRD in the VFRD entry section 714, a domain WWN in the domain WWN section 716, a domain MAC in the domain MAC section 718, an NS entry count in the NS entry count section 720, name server information (e.g., a list of local name server entries for a domain/switch device) in the name server information section 722 in association with the NS entry count, a zone and zone member count in the zone and zone member count section 724, and zone information (e.g., zone set information that is active for a domain/switch device) in the zone information section 726 in association with the zone and zone member count. Similarly as discussed above, the VFRD provided in the VFRD entry section 714 may be provided according to the teachings of U.S. patent application Ser. No. 14/860,354, entitled FCoE Frame Forwarding System, filed on Sep. 21, 2015, the disclosure of which is incorporated by reference in its entirety.

As would be understood by one of skill in the art in possession of the present disclosure, the device information that is provided in the L2 FIP device exchange unicast frame 700 provides information that describes the endpoint devices (e.g., via name server information and zone information) connected to the switch device creating that L2 FIP device exchange unicast frame 700. At block 408, following the creation of the L2 FIP device exchange unicast frame 700, the storage fabric engine 304 in the switch device 300 then sends that L2 FIP device exchange unicast frame 700 along each of the best paths (e.g., least cost paths) through the Ethernet fabric 202 that were determined at block 406. Thus, any or all of the participating Ethernet switch devices in the Ethernet fabric 202 that are connected an initiator device 210*a-e* or target device 212*a-c* may provide L2 FIP device exchange unicast frames along paths through the Ethernet fabric 202 at block 408.

Furthermore, at block 404, the storage fabric engine 304 in the switch device 300 may also receive one or more L2 FIP device exchange unicast frame 700 through the communication system 306 (e.g., via ISLs coupled to their inter-switch ports) from other switch devices in the Ethernet fabric 202, and those L2 FIP device exchange unicast frames may include device information associated with endpoint devices connected to those switch devices as discussed above. In response to receiving the L2 FIP device exchange unicast frame 700 from other switch devices in the Ethernet fabric 202, the storage fabric engine 304 may create and build a device and zoning information database in the storage fabric database(s) 308 by adding the device information in the L2 FIP device exchange unicast frame 700 (e.g., the name server information and zone information) to that device and zoning information database. Furthermore, as the L2 FIP device exchange unicast frame 700 moves through the Ethernet fabric 202, the storage fabric engine 304 participating Ethernet switch device in the Ethernet fabric 202 that receive the L2 FIP device exchange unicast frame 700 may also add device information in the L2 FIP device exchange unicast frame 700 by, for example, incrementing the NS entry count in the NS entry count section 722, providing name server information (e.g., a list of local name server entries for a domain/switch device) in the name server information section 722 in association with the incremented NS entry count, incrementing the zone and zone member count in the zone and zone member count section 724, and providing zone information (e.g., zone set information that is active for a domain/switch device) in the zone information section 726 in association with the incremented zone and zone member count. After providing its device information in a received L2 FIP device exchange unicast frame, the storage fabric engine 304 may then forward that L2 FIP device exchange unicast frame 700 along the best path (e.g., least cost path).

As such, the participating Ethernet switch devices in the Ethernet fabric 202 may collect and store name server information and zone information for each of the endpoint devices connected to the Ethernet fabric 202 by retrieving that name server information and zone information from the L2 FIP device exchange unicast frames. The exchange of the device information between the participating Ethernet switch devices via the L2 control plane allows for each of the participating Ethernet switch devices to build up their device and zoning information databases so that each of the participating Ethernet switch devices has knowledge of each of the endpoint devices coupled to the Ethernet fabric 202, and is able to allow or prohibit communication by link endpoints across the Ethernet fabric 202 (i.e., using the zoning information). As would be understood by one of skill in the art in possession of the present disclosure, non-participating Ethernet switch devices in the Ethernet fabric 202 may ignore the FIP domain exchange multicast frames exchanged at block 402 and simply forward them as performed with any other valid L2 frame. The Ethernet fabric login required for device link endpoints and the building of the device and zoning information databases provides for an Ethernet fabric device membership that is deterministic and known before any data is exchanged via the Ethernet fabric 202 between endpoint devices connected to that Ethernet fabric 202.

The method 400 then proceeds to block 410 where switch devices transmit data between initiator device(s) and target device(s) using the device information and the path costs. Following block 408, the Ethernet SAN system 200 includes a deterministic link topology between the switch devices, a deterministic fabric topology between the endpoint devices, and behavioral rules for communication via the zone information. As such, the Ethernet fabric 202 in the Ethernet SAN system 200 may be considered "initialized", "set up", or otherwise "ready", and the Ethernet fabric 202 may be used to transmit data between any of the initiator devices 210a-c and target devices 212a-c. For example, the storage fabric engine 304 in the switch device 200 that is connected to the initiator device 210a may receive a data frame that is directed to the target device 212a, and may then access the device and zoning information database(s) and path costs determined as discussed above to route that data frame along a best path (e.g., a least cost path) through the Ethernet fabric 202, while each switch device in the Ethernet fabric 202 may forward that data frame in a similar manner until it reaches the target device 212a. In some embodiments, the forwarding of the data frame may be forwarded to a non-participating Ethernet switch device in the Ethernet fabric 202, and may include sufficient information for that non-participating Ethernet switch device to forward the data frame along the best path such that it reaches the participating Ethernet switch device that is connected to the target device 212a (i.e., the vendor unique L2 FIP frames are forwarded through non-participating L2 switches in the same manner as any other L2 packet.) Furthermore, one of skill in the art in possession of the present disclosure will recognize how data frames may be received from any of the target devices 212a-c and forwarded through the Ethernet fabric 202 in a similar manner while remaining within the scope of the present disclosure. Thus, the method 400 may operate at block 410 to transmit data frames between initiator device(s) and target device(s) using the Ethernet fabric 202 until a change in the Ethernet fabric 202 occurs, at which point the method 400 may proceed to the remaining blocks discussed below that provides for management of the Ethernet fabric 202 to address changes in the Ethernet fabric 202 and/or endpoint devices connected to the Ethernet fabric 202.

The method 400 then proceeds to block 412 where switch devices exchange L2 FIP Inter-Switch Link (ISL) State Change Notification (SCN) unicast frames that include ISL change information. As discussed above, conventional Ethernet fabrics provide for time-lagged and indeterminate knowledge of the state of ISLs, and even the knowledge of what state a link is in is indeterminate as there is no hardware level link state detection mechanism or state machine provided in conventional Ethernet fabrics other than bit synch and LED indicators associated with ports that provide links. As such, relatively long timeout values are used to determine the condition of a path in conventional Ethernet fabrics, as well as to take action to assert control over the network control plane, and these long delays cause the Ethernet fabric state awareness to lag behind the actual link state transitions by anywhere from several seconds (e.g., 7-10 seconds) and up to minutes, thus delaying ISL link state recovery mechanisms. These delays cause a delay in the propagation of knowledge about links states through the Ethernet fabric that can reach the upper level protocol timeout range, causing long delays for failover and other control plane recovery actions. The method 400 allows the Ethernet fabric 202 to remedy that issue, at least in part, by detecting ISL changes in the Ethernet fabric 202 and, in response, creating and sending L2 FIP ISL SCN unicast frames to other participating Ethernet switch devices in the Ethernet fabric 202.

In an embodiment, at block 412 the storage fabric engine 304 in the switch device 300 may detect an ISL state change and, in response, create an L2 FIP ISL SCN unicast frame that includes ISL change information, and then send the L2 FIP ISL SCN unicast frame to each of the participating Ethernet switch devices in the Ethernet fabric 202. One of skill in the art in possession of the present disclosure will recognize that L2 FIP ISL SCN unicast frames may be created and sent as discussed below anytime an ISL to a participating Ethernet switch device changes by, for example, an ISL being added to that participating Ethernet switch device, an ISL being removed from that participating Ethernet switch device, an ISL to that participating Ethernet switch device changing in characteristics, a zone change, and/or other fabric events that are known to cause ISL state changes. Furthermore, in response to receiving an L2 FIP ISL SCN unicast frame, the participating Ethernet switch devices may distribute a device format SCN out to the link endpoint devices that are effected by the ISL change.

In some embodiments, the state of an ISL may be considered binary (e.g., online or offline) despite that actual link fabric link state being much more complicated at the physical and device registration level. In such embodiments, the "online" ISL state may represent that both the ISL and the port level state machine of the port providing that ISL are "up" and the Ethernet fabric topology is known, while the "offline" ISL state may represent all other states other than "up" where the Ethernet fabric topology is not considered valid to the point where data may flow through it. However, one of skill in the art in possession of the present disclosure will recognize that more complicated state definitions will fall within the scope of the present disclosure as well. However, continuing with the binary ISL state example, when an ISL provided by an inter-switch port in the communication system 306 changes states from online to offline, or from offline to online, the storage fabric engine 304 will detect that change and create the L2 FIP ISL SCN unicast frame and send it to the other participating Ethernet switch devices in the Ethernet fabric 202.

Figure 8A:
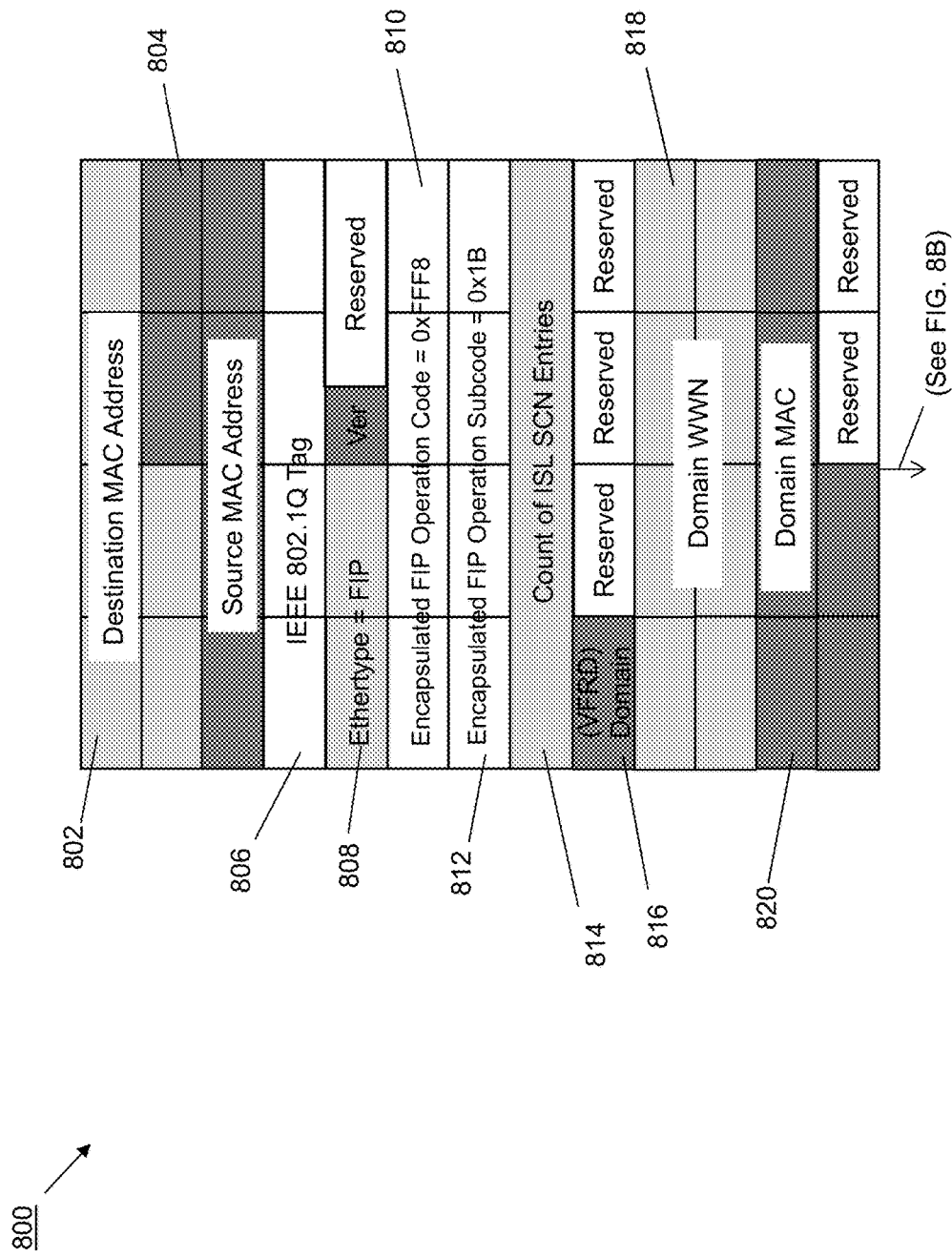
FIG. 8A is a schematic view illustrating an embodiment of a portion of an L2 FIP Inter-Switch Link (ISL) State Change Notification (SCN) unicast frame.
Figure 8B:
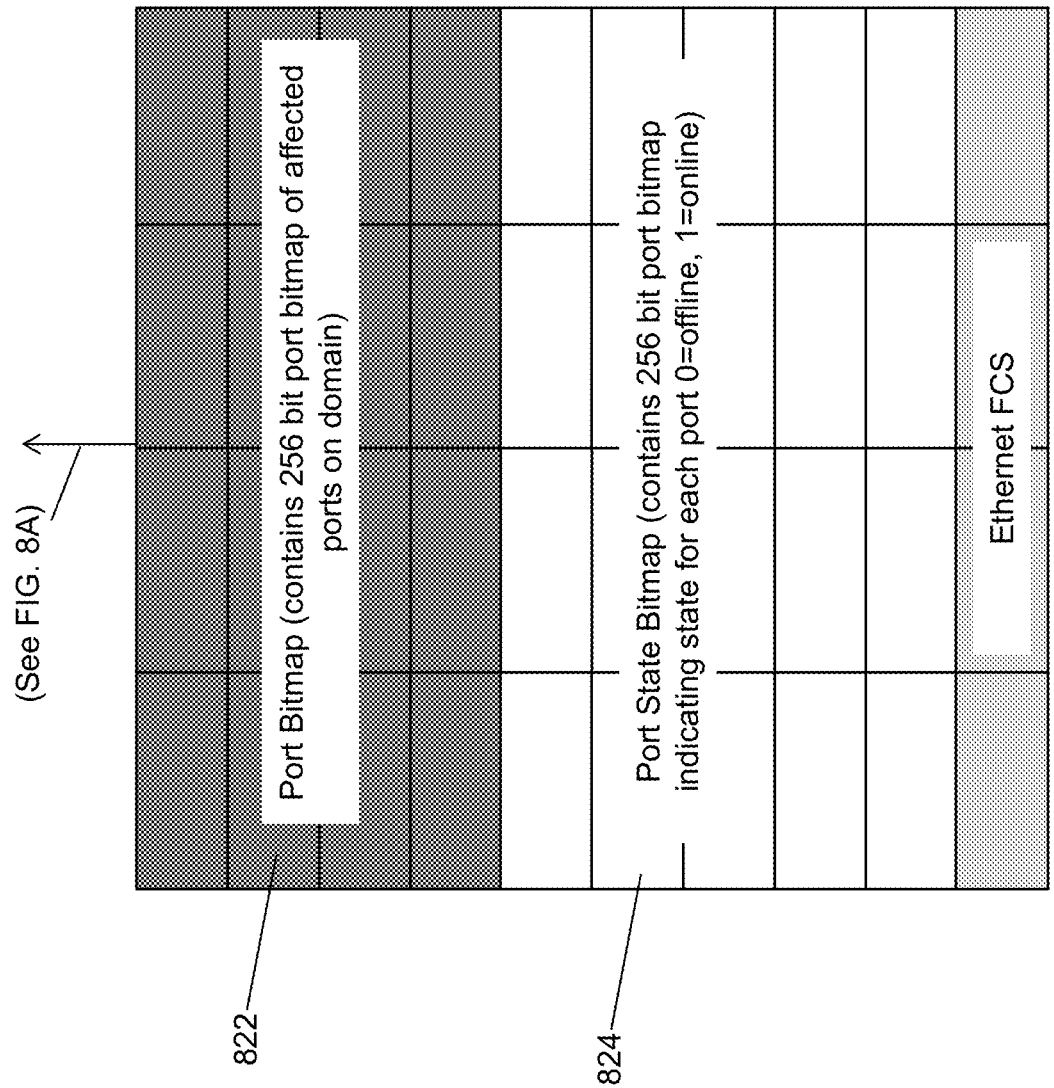
FIG. 8B is a schematic view illustrating an embodiment of a portion of the L2 FIP ISL SCN unicast frame of FIG. 8A.

FIGS. 8A and 8B illustrate an embodiment of an L2 FIP ISL SCN unicast frame 800 that may be created, sent, and received by the switch devices at block 412. In several embodiments, the FIP ISL SCN unicast frames 800 are not registered for by any of the participating Ethernet switch devices, but rather may be sent by any participating Ethernet switch device that detects an ISL change to each of the other participating Ethernet switch devices in the Ethernet fabric 202. In an embodiment, the L2 FIP ISL SCN unicast frame 800 may be an FIP unicast frame. In the illustrated example, the L2 FIP ISL SCN unicast frame 800 includes a destination MAC address section 802, a source MAC address section 804, an IEEE 802.1Q tag section 806, an Ethertype section 808, an encapsulated FIP operation code section 810, an encapsulated FIP operation subcode section 812, an ISL SCN entry count section 814, a VFRD entry section 816, a domain WWN section 818, a domain MAC section 820, a port bitmap section 822, and a port state bitmap section 824. However, other sections may be provided in the frame 800 while remaining within the scope of the present disclosure.

In an embodiment, at block 412 the storage fabric engine 304 in the switch device 300 may create the L2 FIP ISL SCN unicast frame 800 by providing an ethertype (e.g., "FIP" in the illustrated embodiment) in the ethertype section 808, providing an operation code (e.g., "0xFFF8", a vendor specific operation code, in the illustrated embodiment) in the encapsulated FIP operation code section 810, and providing an operation subcode (e.g., "0x1B", a reserved operation subcode, in the illustrated embodiment) in the encapsulated FIP operation subcode section 812. As would be understood by one of skill in the art in possession of the present disclosure, the ethertype, operation code, and operation subcode allow switch devices receiving the L2 FIP ISL SCN unicast frame 800 to notify other participating Ethernet switch devices about changes in the state of the ISLs between the participating Ethernet switch devices/domains, including when domains are added or removed from the Ethernet fabric 202. In addition, at block 412 the storage fabric engine 304 in the switch device 300 may provide ISL change information in the L2 FIP ISL SCN unicast frame 800 by, for example, providing an ISL SCN entry count in the ISL SCN entry count section 814, and associating that ISL SCN entry count with a VFRD in the VFRD entry section, a domain WWN in the domain WWN section 818, a domain MAC in the domain MAC section 820, a port bitmap in the port bitmap section 822 that includes the inter-switch ports effected by the ISL change, and a port state bitmap in the port state bitmap section 824 that includes the port state of the ports effected by the ISL change. Similarly as discussed above, the VFRD provided in the VFRD entry section 816 may be provided according to the teachings of U.S. patent application Ser. No. 14/860,354, attorney docket no. 16356.1761US01, entitled FCoE Frame Forwarding System, filed on Sep. 21, 2015, the disclosure of which is incorporated by reference in its entirety.

As would be understood by one of skill in the art in possession of the present disclosure, the ISL change information that is provided in the L2 FIP ISL SCN unicast frame 800 provides information that describes the change in that ISL that was or is connected to the switch device creating that L2 FIP ISL SCN unicast frame 800, and may be used to notify other participating Ethernet switch devices about changes in the state of the ISLs between participating Ethernet switch devices/domains, including when domains are added or removed from the Ethernet fabric 202. At block 412, following the creation of the L2 FIP ISL SCN unicast frame 800, the switch device 300 then sends that L2 FIP ISL SCN unicast frame 800 to each participating Ethernet switch device in the Ethernet fabric 202. Thus, any or all of the participating Ethernet switch devices in the Ethernet fabric 202 may detect changes in their ISLs and provide L2 FIP ISL SCN unicast frames to others of the participating Ethernet switch devices in the Ethernet fabric 202 at block 412.

The method 400 then proceeds to block 414 where switch devices recalculate path costs using the ISL change information. In an embodiment, in response to receiving the L2 FIP ISL SCN unicast frame at block 412, the storage fabric engine 304 in the switch device 300 may use the ISL change information received at block 412 (as well as any path information stored in its link state database) in order to recalculate path costs of paths through the Ethernet fabric 202 in light of the ISL change. For example, at block 414, the storage fabric engine 304 may reference the link state database it created at block 404 and, based on the ISL change information, perform the path cost algorithm again in order to recalculate a plurality of path costs for paths through the Ethernet fabric 202. In a specific example, the path cost algorithm may be the FSPF algorithm discussed above, and one of skill in the art in possession of the present disclosure will recognize how the path cost algorithm may be performed at block 414 to recalculate path costs and possibly determine new best paths (e.g., least cost paths) through the Ethernet fabric 202 that take into account the ISL change(s). Thus, following block 412, each of the participating Ethernet switch devices in the Ethernet fabric 202 may have recalculated the path costs for paths through the Ethernet fabric 202, thus providing the path costs for any path data frames may take through the Ethernet fabric 202 using L2 Ethernet subsequent to at least one ISL change in the Ethernet fabric 202. As such, recalculated best paths (e.g., least cost paths) between each of the initiator devices 210*a-c* and the target devices 212*a-c* are known following one or more ISL changes at block 412. One of skill in the art in possession of the present disclosure will recognize that the L2 FIP ISL SCN unicast frames of the present disclosure may be exchanged at block 412 in millisecond time frames, which provides for the recalculation of path costs at block 414, as well as failover actions, zoning checks, Ethernet fabric rebuilds, and/or other fabric recovery actions to be performed nearly instantaneously so that the Ethernet fabric 202 can quickly recovery from the ISL change.

The method 400 then proceeds to block 416 where switch devices exchange L2 FIP device link SCN unicast frames that include device link change information. As discussed above, conventional Ethernet fabrics typically use timeouts to determine device link states between switch devices and endpoint devices. Even with FCoE, the most prevalent deterministic attempt to provide storage traffic over Ethernet fabrics, device link states are determined using device link keep-alive timers that probe the device link state in the Ethernet fabric between endpoint devices and FC forwarders at intervals in order to determine the condition of a path to determine whether to to assert control over the network control plane. These keep-alive frames (and the unsolicited discovery advertisements that are exchanged for this purpose) are provided on the order of several seconds, and keep-alive retries that are inherent in the protocol cause the Ethernet fabric device link awareness to lag the actual device link state transitions by anywhere from several seconds (e.g., 7-10 seconds) and up to minutes, thus delaying device link state recovery mechanisms. These delays result in further delays in the propagation of knowledge about device link states through the Ethernet fabric that can reach the upper level protocol timeout range, causing long delays for failover and other control plane recovery actions. The method 400 allows the Ethernet fabric 202 to remedy that issue, at least in part, by detecting device link changes with the Ethernet fabric 202 and, in response, creating and sending L2 FIP device link SCN unicast frames to other participating Ethernet switch devices in the Ethernet fabric 202.

In an embodiment, at block 416 the storage fabric engine 304 in the switch device 300 may detect device link state change and, in response, create an L2 FIP device link SCN unicast frame that includes device link change information, and then send the L2 FIP device link SCN unicast frame to each of the participating Ethernet switch devices in the Ethernet fabric 202 and the endpoint devices connected to the Ethernet fabric 202. One of skill in the art in possession of the present disclosure will recognize that L2 FIP device link SCN unicast frames may be created and sent as discussed below anytime a device link to a participating Ethernet switch devices changes by, for example, an endpoint device being connected to that participating Ethernet switch device, an endpoint device being removed from that participating Ethernet switch device, a device link between an endpoint device and that participating Ethernet switch device changing in characteristics, a zone change, and/or other device link state changes known in the art.

In some embodiments, the state of device link may be considered binary (e.g., online or offline) despite that actual device link states being much more complicated at the physical and device registration level. In such embodiments, the "online" device link state may represent that both the device link and the port level state machine of the port providing that device link are "up" and the Ethernet fabric topology is known, while the "offline" device link state may represent all other states other than "up" where the Ethernet fabric topology is not considered valid to the point where data may flow through it. However, one of skill in the art in possession of the present disclosure will recognize that more complicated state definitions will fall within the scope of the present disclosure as well. However, continuing with the binary device link state example, when a device link provided by an device port in the communication system 306 changes states from online to offline, or from offline to online, the storage fabric engine 304 will detect that change and create the L2 FIP device link SCN unicast frame and send it to the other participating Ethernet switch devices in the Ethernet fabric 202.

Figure 9A:
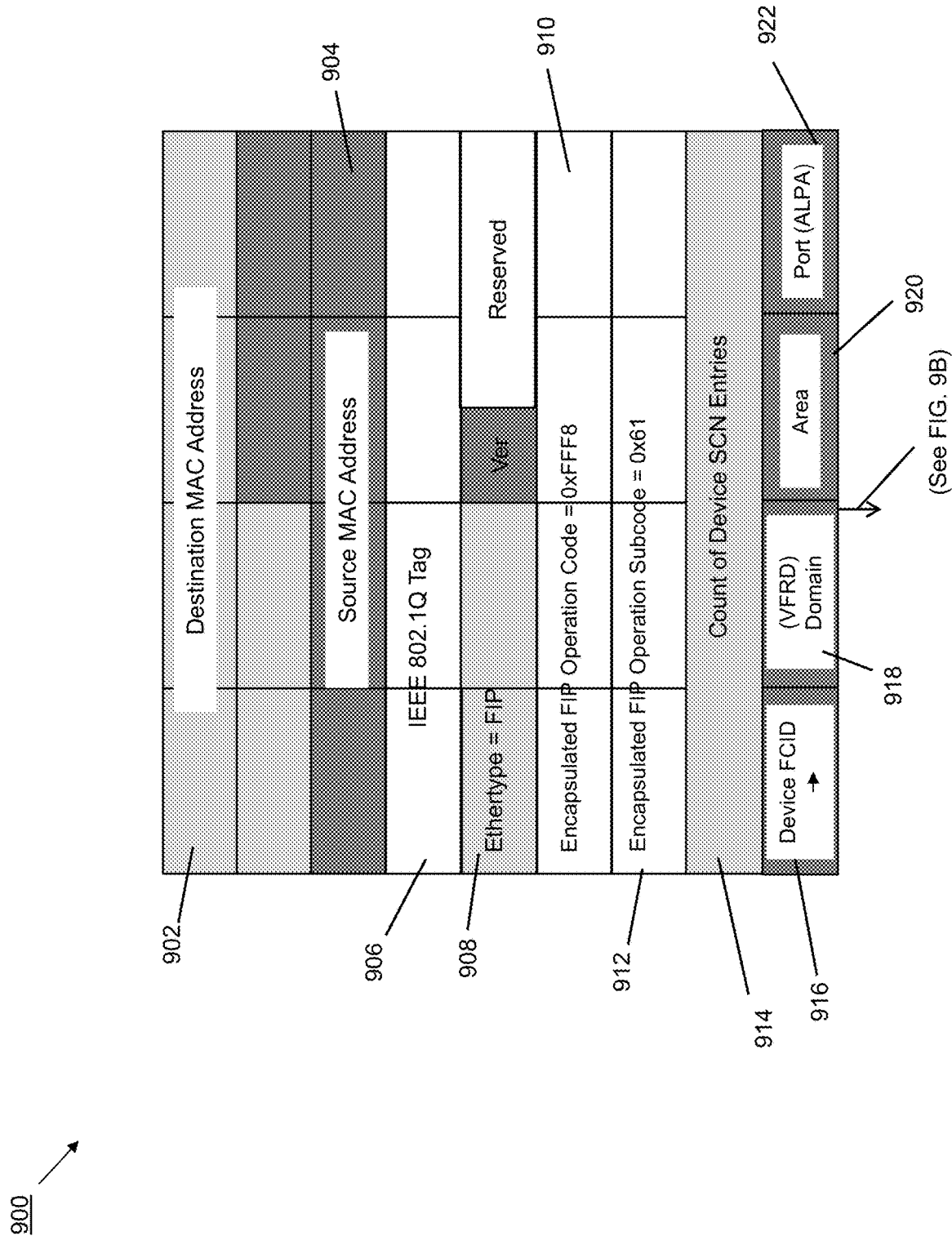
FIG. 9A is a schematic view illustrating an embodiment of a portion of an L2 FIP device link SCN unicast frame.

FIGS. 9A and 9B illustrate an embodiment of an L2 FIP device link SCN unicast frame 900 that may be created, sent, and received by the switch devices at block 416. In several embodiments, the L2 FIP device link SCN unicast frames 900 are not registered for by any of the participating Ethernet switch devices, but rather may be sent by any participating Ethernet switch device that detects device link change to each of the other participating Ethernet switch devices in the Ethernet fabric 202. In an embodiment, the L2 FIP device link SCN unicast frame 900 may be an FIP unicast frame. In the illustrated example, the L2 FIP device link SCN unicast frame 900 includes a destination MAC address section 902, a source MAC address section 904, an IEEE 802.1Q tag section 906, an Ethertype section 908, an encapsulated FIP operation code section 910, an encapsulated FIP operation subcode section 912, a device link SCN entry count section 914, a first device FC identifier section 916, a first VFRD entry section 918, a first area section 920, a first port section 922, a first device WWN section 924, a first device MAC section 926, a first link state information section 928, a second device FC identifier section 930, a second VFRD entry section 932, a second area section 934, a second port section 936, a second device WWN section 938, a second device MAC section 940, and a second link state information section 942. However, other sections may be provided in the frame 900 while remaining within the scope of the present disclosure.

In an embodiment, at block 416 the storage fabric engine 304 in the switch device 300 may create the L2 FIP device link SCN unicast frame 900 by providing an ethertype (e.g., "FIP" in the illustrated embodiment) in the ethertype section 908, providing an operation code (e.g., "0xFFF8", a vendor specific operation code, in the illustrated embodiment) in the encapsulated FIP operation code section 910, and providing an operation subcode (e.g., "0x61", a reserved operation subcode, in the illustrated embodiment) in the encapsulated FIP operation subcode section 912. As would be understood by one of skill in the art in possession of the present disclosure, the ethertype, operation code, and operation subcode allow switch devices receiving the L2 FIP device link SCN unicast frame 900 to distribute information to local devices about changes in the state of remote devices. In addition, at block 416 the storage fabric engine 304 in the switch device 300 may provide device link change information in the L2 FIP device link SCN unicast frame 900 by, for example, providing a device link SCN entry count in the device link SCN entry count section 914 and associating that device link SCN entry count with a device FC identifier in the first device FC identifier section 916 that identifies an endpoint device to which a device link has changed, a VFRD in the first VFRD entry section 918 for the endpoint device to which the device link has changed, an area in the first area section 920 to indicate when devices on a physical port change state (whether a single or multi-device port such as an arbitrated loop or NPIV port), a port identifier in the first port section 922 for the port on the switch device that provide the device link that has changed, a device WWN in the first device WWN section 924 for the endpoint device to which the device link has changed, a device MAC in the first device MAC section 926 for the endpoint device to which the device link has changed, and link state information section in the first link state information section 928 that indicates the state of the device link. In a specific example, device link changes may effect any of the following scopes: (1) a fabric scope in which all devices in the fabric are affected (e.g., when zoning changes are detected), (2) a domain scope in which any device in the fabric may be affected depending on zones (e.g., may contain information about all of the devices that are part of a given domain, (3) an area scope in which a device in the fabric may be affected depending on zones (i.e., may contain information about all of the devices on a given physical port for either single or multi-port devices, (4) an ALPA (or port) scope in which a single link end point device if effected (e.g., the only device on a single device physical port, or a single one of the devices on an Arbitrated Loop or NPIV port).

In addition, the storage fabric engine 304 in the switch device 300 may provide device link change information in the L2 FIP device link SCN unicast frame 900 by, for example, providing a device link SCN entry count in the device link SCN entry count section 914 and associating that device link SCN entry count with a device FC identifier in the second device FC identifier section 930, a VFRD entry in the second VFRD entry section 932, an area in the second area section 934, a port in the second port section 936, a device WWN in the second device WWN section 938, a device MAC in the second device MAC section 940, and link state information in the second link state information section 942. One of skill in the art in possession of the present disclosure will recognize that the L2 FIP device link SCN unicast frame 900 may hold information about a list of devices (e.g., each associated with a device link SCN entry count). For example, a powered down server with a four-port HBA or CAN may cause four devices to go offline, and each of those four device may be identified in the L2 FIP device link SCN unicast frame 900 as discussed above. Similarly as discussed above, the VFRD provided in the VFRD entry sections 918 and 932 may be provided according to the teachings of U.S. patent application Ser. No. 14/860,354, entitled FCoE Frame Forwarding System, filed on Sep. 21, 2015, the disclosure of which is incorporated by reference in its entirety.

As would be understood by one of skill in the art in possession of the present disclosure, the device link change information that is provided in the L2 FIP device link SCN unicast frame 900 provides information that describes the change in that device link that was or is connected to the switch device creating that L2 FIP device link SCN unicast frame 900. At block 416, following the creation of the L2 FIP device link SCN unicast frame 900, the switch device 300 then sends that L2 FIP device link SCN unicast frame 900 to each participating Ethernet switch device in the Ethernet fabric 202. Thus, any or all of the participating Ethernet switch devices in the Ethernet fabric 202 may detect changes in the device links to connected endpoint devices (e.g., the initiator devices 210*a-c* or the target devices 212*a-c*) and, in response, provide L2 FIP device link SCN unicast frames to others of the participating Ethernet switch devices in the Ethernet fabric 202 at block 416.

The method 400 then proceeds to block 418 where switch devices perform data transmission modification(s) using the device link change information. In an embodiment, in response to receiving the L2 FIP device link SCN unicast frame at block 416, the storage fabric engine 304 in the switch device 300 may use the device link change information received at block 416 in order to perform at least one data transmission modification. For example, at block 418, the storage fabric engine 304 may determine that the device link change information indicates that a primary target device (e.g., a primary storage system) is no longer available and, in response, select a redundant target device (e.g., a redundant storage system) to fulfill requests to the primary target device that has become unavailable due to the device link change. In another example, at block 418, the storage fabric engine 304 may determine that the device link change information indicates that an initiator device has had multiple device link added and, in response, aggregate those device links to increase bandwidth between the initiator device and its switch device. However, in other examples, the storage fabric engine 304 may perform other failover actions, zoning checks, follow-on authentication, and/or other device link change actions known in the art. One of skill in the art in possession of the present disclosure will recognize that the L2 FIP device link SCN unicast frames of the present disclosure may be exchanged at block 416 in millisecond time frames, which provides for data transmission modification, as well as failover actions, zoning checks, follow-on authentication, and other device link change actions to be performed nearly instantaneously so that the Ethernet fabric 202 can quickly recovery from or capitalize on the device link change.

Thus, systems and methods have been described that provide a storage-hardened, storage-protocol-aware, agnostic Ethernet SAN fabric with deterministic link topology, deterministic flow control, and distributed state change notifications. This is accomplished through the use of SAN-aware edge switch devices that include built-in storage intelligence and awareness along with remote control capability via SDN, vendor unique FIP/FCoE frames that flow between switch devices that provide an FCoE Ethernet fabric, and link establishment and control frames to control the state of the Ethernet fabric, enable deterministic link topology, deterministic link state awareness, link state change propagation/notification, rapid error recovery, and highly reliable frame delivery in an Ethernet fabric enabled by relatively inexpensive and highly available Ethernet switch chip enabled switch devices. As such, one of skill in the art in possession of the present disclosure will recognize how the teachings below provide for an Ethernet-based SAN with FC-SAN-like attributes, but with the use of lower cost Ethernet switch devices that have been modified using the teachings of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for providing an Ethernet Storage Area Network (SAN), comprising:
   creating, by a first Ethernet switch chip included in a first Ethernet switch device, a first layer-2 (L2) Fabric Initiation Protocol (FIP) domain exchange multicast frame that includes first domain information and transmitting the first L2 FIP domain exchange multicast frame to a plurality of second Ethernet switch devices;
   receiving, by the first Ethernet switch chip, a plurality of second L2 FIP domain exchange multicast frames that include second domain information associated with the plurality of second Ethernet switch devices that each include a second Ethernet switch chip;
   creating, by the first Ethernet switch chip, a first L2 FIP path exchange multicast frame that includes first path information and transmitting the first L2 FIP path exchange multicast frame to the plurality of second Ethernet switch devices, wherein the first L2 FIP path exchange multicast frame is transmitted based on the second domain information associated with the plurality of second Ethernet switch devices;
   receiving, by the first Ethernet switch chip, a plurality of second L2 FIP path exchange multicast frames that include second path information associated with the plurality of second Ethernet switch devices;
   calculating, by the first Ethernet switch chip, path costs based on the second path information associated with at least some of the plurality of second Ethernet switch devices;
   creating, by the first Ethernet switch chip, a first L2 FIP device exchange unicast frame that includes first device information associated with a first device connected to the first Ethernet switch device and transmitting the first L2 FIP device exchange unicast frame to the plurality of second Ethernet switch devices, wherein the first L2 FIP device exchange unicast frame is transmitted based on the path costs;
   receiving, by the first Ethernet switch chip, a plurality of second L2 FIP device exchange unicast frames that include second device information associated with a second device connected to at one of the plurality of second Ethernet switch devices;
   and transmitting, by the first Ethernet switch chip utilizing Ethernet traffic routing operations, data between the first device and the second device based on the second device information and the path costs.

2. The method of claim 1, further comprising:
   receiving, by the first Ethernet switch chip, an L2 FIP Inter-Switch Link (ISL) State Change Notification (SCN) unicast frame that includes ISL change information associated with one of the plurality of second Ethernet switch devices and, in response, recalculating the path costs based on the ISL change information.

3. The method of claim 1, further comprising:
receiving, by the first Ethernet switch chip, an L2 FIP device link State Change Notification (SCN) unicast frame that includes device link change information associated with the second device and, in response, perform at least one data transmission modification based on the device link change information.

4. The method of claim 3, wherein the L2 FIP device link SCN unicast frame includes device link change information about at least one of (1) at least one device link being added to one of the plurality of second Ethernet switch devices, and (2) at least one device link being removed from one of the plurality of second Ethernet switch devices.

5. The method of claim 1, further comprising:
transmitting, by the first Ethernet switch chip, the L2 FIP domain exchange multicast frames including the first domain information through each of a plurality of inter-switch ports on the first Ethernet switch device.

6. The method of claim 1, further comprising:
building, by the first Ethernet switch chip, a link state database based on the second path information included in the second L2 FIP path exchange multicast frames.

7. The method of claim 1, wherein the second L2 FIP device exchange unicast frames include zone information associated with the second device, and wherein the wherein the method further comprises:
transmitting, by the first Ethernet switch chip, data between the first device and the second device based on the zone information and the path costs.

8. An Ethernet Storage Area Network (SAN) system, comprising:
an initiator device;
a target device; and
an Ethernet fabric coupling the initiator device to the target device, wherein the Ethernet fabric includes a plurality of Ethernet switch devices that each include an Ethernet switch chip that is configured to perform Ethernet traffic routing operations, and wherein each of the Ethernet switch devices are configured to:
create and exchange layer-2 (L2) Fabric Initiation Protocol (FIP) domain exchange multicast frames that include domain information associated with each of the plurality of Ethernet switch devices;
create and exchange L2 FIP path exchange multicast frames that include path information associated with each of the plurality of Ethernet switch devices, wherein the L2 FIP path exchange multicast frames are exchanged based on the domain information associated with each of the plurality of Ethernet switch devices;
calculate path costs based on the path information associated with at least some of the plurality of Ethernet switch devices;
create and exchange L2 FIP device exchange unicast frames that include device information associated with the initiator device coupled to at least one of the plurality of Ethernet switch devices and the target device coupled to at least one of the plurality of Ethernet switch devices, wherein the L2 FIP device exchange unicast frames are exchanged between the plurality of Ethernet switch devices based on the path costs; and
transmit, utilizing Ethernet traffic routing operations, data between the initiator device and the target device based on the device information and the path costs.

9. The system of claim 8, wherein the Ethernet switch chip provided in each of the plurality of Ethernet switch devices is configured to:
exchange L2 FIP Inter-Switch Link (ISL) State Change Notification (SCN) unicast frames that include ISL change information associated with at least one of the plurality of Ethernet switch devices and, in response, recalculate the path costs based on the ISL change information.

10. The system of claim 8, wherein the Ethernet switch chip provided in each of the plurality of Ethernet switch devices is configured to:
exchange L2 FIP device link State Change Notification (SCN) unicast frames that include device link change information associated with at least one of the initiator device and the target device and, in response, perform at least one data transmission modification based on the device link change information.

11. The system of claim 8, wherein the Ethernet switch chip provided in each of the plurality of Ethernet switch devices is configured to:
transmit the L2 FIP domain exchange multicast frames including domain information for that Ethernet switch device through each of its inter-switch ports.

12. The system of claim 8, wherein the Ethernet switch chip provided in each of the plurality of Ethernet switch devices is configured to:
build a link state database based on the path information in the L2 FIP path exchange multicast frames.

13. The system of claim 8, wherein the L2 FIP device exchange unicast frames include zone information associated with the initiator device coupled to at least one of the plurality of Ethernet switch devices and the target device coupled to at least one of the plurality of Ethernet switch devices, and wherein the plurality of Ethernet switch devices are configured to:
transmit data between the initiator device and the target device based on the zone information and the path costs.

14. An Information Handling System (IHS), comprising:
a communication system;
at least one database;
an Ethernet switch processing system that is provided by an Ethernet switch chip that is configured to perform Ethernet traffic routing operations and that is coupled to the communication system and the at least one database; and
a memory system including instructions that, when executed by the Ethernet processing system, causes the Ethernet switch processing system to provide a storage fabric engine that is configured to:
create a first layer-2 (L2) Fabric Initiation Protocol (FIP) domain exchange multicast frame that includes first domain information and transmit the first L2 FIP domain exchange multicast frame through the communication system to a plurality of Ethernet switch devices;
receive a plurality of second L2 FIP domain exchange multicast frames through the communication system that include second domain information associated with the plurality of Ethernet switch devices;
create a first L2 FIP path exchange multicast frame that includes first path information and transmit the first L2 FIP path exchange multicast frame through the communication system to the plurality of Ethernet switch devices, wherein the first L2 FIP path exchange multicast frame is transmitted based on the second domain information associated with the plurality of Ethernet switch devices;

receive a plurality of second L2 FIP path exchange multicast frames through the communication system that include second path information associated with the plurality of Ethernet switch devices;

calculate path costs based on the second path information associated with at least some of the plurality of Ethernet switch devices;

create a first L2 FIP device exchange unicast frame that includes first device information associated with a first device connected to the communication system and transmit the first L2 FIP device exchange unicast frame through the communication system to the plurality of Ethernet switch devices, wherein the first L2 FIP device exchange unicast frame is transmitted to the plurality of Ethernet switch devices based on the path costs;

receive a plurality of second L2 FIP device exchange unicast frames through the communication system that include second device information associated with a second device connected to at one of the plurality of Ethernet switch devices; and transmit, utilizing Ethernet traffic routing operations, data between the first device and the second device through the communication system based on the second device information and the path costs.

15. The IHS of claim 14, wherein the storage fabric engine is configured to:

receive an L2 FIP Inter-Switch Link (ISL) State Change Notification (SCN) unicast frame through the communication system that includes ISL change information associated with one of the plurality of Ethernet switch devices and, in response, recalculate the path costs based on the ISL change information.

16. The IHS of claim 14, wherein the storage fabric engine is configured to:

receive an L2 FIP device link State Change Notification (SCN) unicast frame through the communication system that includes device link change information associated with the second device and, in response, perform at least one data transmission modification based on the device link change information.

17. The IHS of claim 16, wherein the L2 FIP device link SCN unicast frame includes device link change information about at least one of (1) at least one device link being added to one of the plurality of Ethernet switch devices, and (2) at least one device link being removed from one of the plurality of Ethernet switch devices.

18. The IHS of claim 14, wherein the communication system includes a plurality of inter-switch ports, and wherein the storage fabric engine is configured to:

transmit the L2 FIP domain exchange multicast frames including the first domain information through each of the plurality of inter-switch ports.

19. The IHS of claim 14, wherein the storage fabric engine is configured to:

build a link state database based on the second path information included in the second L2 FIP path exchange multicast frames.

20. The IHS of claim 14, wherein the second L2 FIP device exchange unicast frames include zone information associated with the second device, and wherein the wherein the storage fabric engine is configured to:

transmit data between the first device and the second device through the communication system based on the zone information and the path costs.

* * * * *